United States Patent
Hawilo et al.

(10) Patent No.: US 11,562,420 B2
(45) Date of Patent: Jan. 24, 2023

(54) METHOD AND APPARATUS FOR ELECTRONIC TRANSACTIONS BASED ON A REPLY MESSAGE

(71) Applicant: Groupon, Inc., Chicago, IL (US)

(72) Inventors: Joey Hawilo, Chicago, IL (US); Will Megson, Chicago, IL (US); Naren Chainani, Chicago, IL (US); Ganesh Angappan, Ramapuram (IN); Karthik Paulramachandran, Kamarajapuram (IN); Ramya J, Besant Nagar (IN)

(73) Assignee: Groupon, Inc., Chicago, IL (US)

( * ) Notice: Subject to any disclaimer, the term of this patent is extended or adjusted under 35 U.S.C. 154(b) by 703 days.

(21) Appl. No.: 14/836,356

(22) Filed: Aug. 26, 2015

(65) Prior Publication Data

US 2016/0063608 A1     Mar. 3, 2016

Related U.S. Application Data

(60) Provisional application No. 62/041,962, filed on Aug. 26, 2014.

(51) Int. Cl.
   *G06Q 30/06*     (2012.01)
   *H04W 4/21*     (2018.01)
   *H04L 51/18*     (2022.01)

(52) U.S. Cl.
   CPC .......... *G06Q 30/0635* (2013.01); *H04W 4/21* (2018.02); *H04L 51/18* (2013.01)

(58) Field of Classification Search
   CPC ...... G06Q 30/0635; H04W 4/21; H04L 51/18
   USPC .................................................... 705/26–27
   See application file for complete search history.

(56) References Cited

U.S. PATENT DOCUMENTS

| 8,355,948 | B2 | 1/2013 | Mason | |
|---|---|---|---|---|
| 2007/0156621 | A1* | 7/2007 | Wright | G06Q 30/02 706/48 |
| 2010/0010912 | A1 | 1/2010 | Jones et al. | |
| 2010/0312645 | A1* | 12/2010 | Niejadlik | G06Q 30/0257 705/14.55 |

(Continued)

FOREIGN PATENT DOCUMENTS

WO     2006/009424 A2     1/2006

OTHER PUBLICATIONS

"Low Prices on the Go . . . Amazon.Com Announces Daily Deal Text Alerts." Business Wire, Nov. 12, 2008. https://dialog.proquest.com/professional/docview/1072647428?accountid=131444. (Year: 2008).*

(Continued)

*Primary Examiner* — Matthew E Zimmerman
*Assistant Examiner* — Latasha D Ramphal
(74) *Attorney, Agent, or Firm* — Alston & Bird LLP

(57) ABSTRACT

A method, apparatus and computer program product are provided for electronic transactions based on a reply message. In the context of a computer executed method, the method includes receiving a message, from a sender device, including a reply to buy (RTB) identifier associated with a promotion and a RTB validation code. The method also includes authenticating, using a promotion and marketing service host, the RTB validation code, associating the message from the sender with a recipient identifier, and causing the transmission of a purchase order message to the recipient device based on the RTB identifier.

20 Claims, 13 Drawing Sheets

(56) References Cited

U.S. PATENT DOCUMENTS

| | | | |
|---|---|---|---|
| 2012/0030048 A1* | 2/2012 | Manley | G06Q 30/0641 |
| | | | 705/26.1 |
| 2012/0246031 A1* | 9/2012 | Sherwin | G06Q 30/0601 |
| | | | 455/406 |
| 2013/0275264 A1* | 10/2013 | Lindenberg | G06Q 50/01 |
| | | | 705/26.1 |
| 2013/0304576 A1 | 11/2013 | Berland et al. | |
| 2014/0136346 A1 | 5/2014 | Teso | |

OTHER PUBLICATIONS

International Search Report and Written Opinion from International Application No. PCT/IB15/56479.

U.S. Appl. No. 13/411,502, filed Mar. 2, 2012; In re: O'Brien et al., entitled *Relevance System for Consumer Deals*.

U.S. Appl. No. 13/829,581, filed Mar. 14, 2013; In re: Aggarwal et al., entitled *Promotion Offering System*.

U.S. Appl. No. 13/839,360, filed Mar. 15, 2013; In re: Chang et al., entitled *Dynamic Promotion Analytics*.

Extended European Search Report for Application No. EP 15 83 5367 dated Jan. 4, 2018, 7 pages.

Summons to Attend Oral Proceedings for European Appln 15835367.2 dated Jul. 13, 2020 (11 pages).

* cited by examiner

METHOD AND APPARATUS FOR ELECTRONIC TRANSACTIONS BASED ON A REPLY MESSAGE

CROSS REFERENCE TO RELATED APPLICATIONS

This application claims priority to and is a nonprovisional application of U.S. Provisional Application No. 62/041,962, filed Aug. 26, 2014, which is incorporated by reference herein in its entirety

TECHNOLOGICAL FIELD

An example embodiment of the present invention relates to electronic transactions and more particularly to a method apparatus and computer program product for electronic transactions based on a reply message.

BACKGROUND

Each month it is estimated that there are 1.6 million monthly cart abandonments on electronic transactions. At least a portion of these cart abandonments may be attributable to the level of user interaction required to complete the transaction. In some electronic message transactions, a consumer may be required to select a link or other activation component to open a secondary application, such as a web browser, to complete the transaction. In such cases, the consumer may be required to input purchasing information, such as name, address, payment information, or the like. The purchase information then may be sent by the secondary application to a processor server to complete the transaction. These message based electronic transactions require significant user interaction to complete the transaction.

BRIEF SUMMARY

A method, apparatus and computer program product are provided in accordance with an example embodiment for electronic transactions based on a reply message. In some embodiments, a computer executable method is provided that includes receiving a message, from a sender device, including a reply to buy (RTB) identifier associated with a promotion and a RTB validation code. The method also includes authenticating, using a promotion and marketing service host, the RTB validation code, associating the message from the sender with a recipient identifier and causing the transmission of a purchase order message to the recipient device based on the RTB identifier.

In an example embodiment, the method may also include receiving discretionary data, electronic marketing data, and communications channel data from the sender device, receiving promotion parameters associated with a plurality of promotions, and determining a first relevance criteria based on at least one of the discretionary data, electronic marketing data, and communications channel data. The method may also include generating a first ranking of the plurality of promotions based on correlating the first relevance criteria to the promotion parameters of the plurality of promotions, determining a second relevance criteria based on at least one of the discretionary data, electronic marketing data, and the communications channel data, and generating a second ranking of the plurality of promotions based on correlating the second relevance criteria to the promotion parameters of the plurality of promotions. The method also includes comparing the first and second ranking of the plurality promotions to a relevance threshold, and determining relevant promotions based on the first or second ranking or promotions satisfying the relevance threshold. The RTB identifier is associated a relevant promotion.

In an example embodiment, the method includes receiving an RTB confirmation message from the recipient device in response to transmission of the RTB purchase order message and causing a transmission of the confirmation message to the sender device. In some example embodiments, the method includes assigning a first transaction address to a sender device and a second transaction address to a recipient device thereby associating the message from the sender device with the first transaction address. In still other embodiments, the causing the transmission of the purchase order message to the recipient device uses the first transaction address.

In some example embodiments, the method includes associating the RTB confirmation message with the second transactional address and causing the transmission of the RTB confirmation message to the sender device uses the second transaction address. In an example embodiment, the method includes generating an RTB prompt including the RTB identifier and causing the transmission of the RTB prompt.

In an example embodiment, the method includes determining relevant promotions and the RTB identifier is associated with at least one relevant promotion. In an example embodiment of the method, the message from the sender device is an RTB reply message indicative of selection promotion associated with the RTB prompt. In some example embodiments of the method, causing the transmission of the RTB prompt includes transmitting a RTB message.

In an example embodiment of the method, the RTB message includes a RTB message address based on the RTB identifier. In some example embodiments of the method, the RTB identifier is further based on a consumer identifier.

In another example embodiment an apparatus is provided including at least one processor and at least one memory including computer program code, the at least one memory and computer program code configured to, with the processor, cause the apparatus to at least receive a message, from a sender device, including a reply to buy (RTB) identifier associated with a promotion and a RTB validation code. The at least one memory and the computer program code are also configured to authenticate the RTB validation code, associate the message from the sender with a recipient identifier and cause the transmission of a purchase order message to the recipient device based on the RTB identifier.

In an example embodiment, the at least one memory and the computer program code, of the apparatus, are further configured to receive discretionary data, electronic marketing data, and communications channel data from the sender device, receive promotion parameters associated with a plurality of promotions, and determine a first relevance criteria based on at least one of the discretionary data, electronic marketing data, and communications channel data. The at least one memory and the computer program code are also configured to generate a first ranking of the plurality of promotions based on correlating the first relevance criteria to the promotion parameters of the plurality of promotions, determine a second relevance criteria based on at least one of the discretionary data, electronic marketing data, and the communications channel data, and generate a second ranking of the plurality of promotions based on correlating the second relevance criteria to the promotion parameters of the plurality of promotions. The at least one memory and the computer program code are also configured to compare the first and second ranking of the plurality promotions to a relevance threshold, and determining relevant promotions based on the first or second ranking or promotions satisfying the relevance threshold. The RTB identifier is associated a relevant promotion.

In an example embodiment of the apparatus the at least one memory and the computer program code are further configured to receive an RTB confirmation message from the recipient device in response to transmission of the RTB purchase order message and cause a transmission of the confirmation message to the sender device. In some example embodiments of the apparatus, the at least one memory and the computer program code are further configured to assign a first transaction address to a sender device and a second transaction address to a recipient device, associate the message from the sender device with the first transaction address, and causing the transmission of the purchase order message to the recipient device uses the first transaction address.

In an example embodiment of the apparatus, the at least one memory and the computer program code are further configured to associate the RTB confirmation message with the second transactional address and causing the transmission of the RTB confirmation message to the sender device uses the second transaction address. In some example embodiments of the apparatus, the at least one memory and the computer program code are further configured to generate an RTB prompt including the RTB identifier and cause the transmission of the RTB prompt.

In some example embodiments of the apparatus, the at least one memory and the computer program code are further configured to determine relevant promotions and the RTB identifier is associated with at least one relevant promotion. In an example embodiment of the apparatus, the message from the sender device is an RTB reply message indicative of selection promotion associated with the RTB prompt.

In an example embodiment of the apparatus, causing the transmission of the RTB prompt comprises transmitting an RTB message. In some example embodiments of the apparatus, the RTB message includes a RTB message address based on the RTB identifier. In an example embodiment of the apparatus, RTB identifier is further based on a consumer identifier.

In a further embodiment, a computer program product is provided including at least one non-transitory computer-readable storage medium having computer-executable program code portions stored therein, the computer-executable program code portions including program code instructions configured to receive a message, from a sender device, comprising a reply to buy (RTB) identifier associated with a promotion and a RTB validation code. The computer-executable program code portions further include program code instructions configured to authenticate the RTB validation code, associate the message from the sender with a recipient identifier, and cause the transmission of a purchase order message to the recipient device based on the RTB identifier.

In an example embodiment of the computer program product, the computer-executable program code portions further comprise program code instructions configured to receive discretionary data, electronic marketing data, and communications channel data from the sender device, receive promotion parameters associated with a plurality of promotions, and determine a first relevance criteria based on at least one of the discretionary data, electronic marketing data, and communications channel data. The computer-executable program code portions also comprise program code instructions configured to generate a first ranking of the plurality of promotions based on correlating the first relevance criteria to the promotion parameters of the plurality of promotions, determine a second relevance criteria based on at least one of the discretionary data, electronic marketing data, and the communications channel data, and generate a second ranking of the plurality of promotions based on correlating the second relevance criteria to the promotion parameters of the plurality of promotions. The computer-executable program code portions also comprise program code instructions configured to compare the first and second ranking of the plurality promotions to a relevance threshold and determining relevant promotions based on the first or second ranking or promotions satisfying the relevance threshold. The RTB identifier is associated a relevant promotion.

In an example embodiment of the computer program product, the computer-executable program code portions further include program code instructions configured to receive an RTB confirmation message from the recipient device in response to transmission of the RTB purchase order message and cause a transmission of the confirmation message to the sender device. In some example embodiments of the computer program product, the computer-executable program code portions further include program code instructions configured to assign a first transaction address to a sender device and a second transaction address to a recipient device associate the message from the sender device with the first transaction address, and causing the transmission of the purchase order message to the recipient device uses the first transaction address.

In an example embodiment of the computer program product, the computer-executable program code portions further include program code instructions configured to associate the RTB confirmation message with the second transactional address and causing the transmission of the RTB confirmation message to the sender device uses the second transaction address. In some example embodiments of the computer program product, the computer-executable program code portions further comprise program code instructions configured to generate an RTB prompt including the RTB identifier and cause the transmission of the RTB prompt.

In an example embodiment of the computer program product the computer-executable program code portions further comprise program code instructions configured to determine relevant promotions and the RTB identifier is associated with at least one relevant promotion. In some example embodiments of the computer program product, the message from the sender device is an RTB reply message indicative of selection promotion associated with the RTB prompt.

In an example embodiment computer program product, causing the transmission of the RTB prompt including transmitting an RTB message. In some example embodiments of the computer program product, the RTB message comprises a RTB message address based on the RTB identifier. In an example embodiment of the computer program product, the RTB identifier is further based on a consumer identifier.

In yet another example embodiment, a computer-executed method for facilitating a transaction is provided including determining a relevant promotion based on promotion parameters and at least one relevance criteria, transmitting a reply to buy (RTB) message to a sender device, wherein the RTB message comprises at least one RTB identifier associated with a relevant promotion. The method also includes receiving a reply message, from a sender device, comprising the RTB identifier associated with a promotion and a RTB validation code, authenticating, using a promotion and marketing service host, the RTB validation code, associating the message from the sender with a recipient identifier, and causing the transmission of a purchase order message to the recipient device based on the RTB identifier.

BRIEF DESCRIPTION OF THE DRAWINGS

Figure 1A:
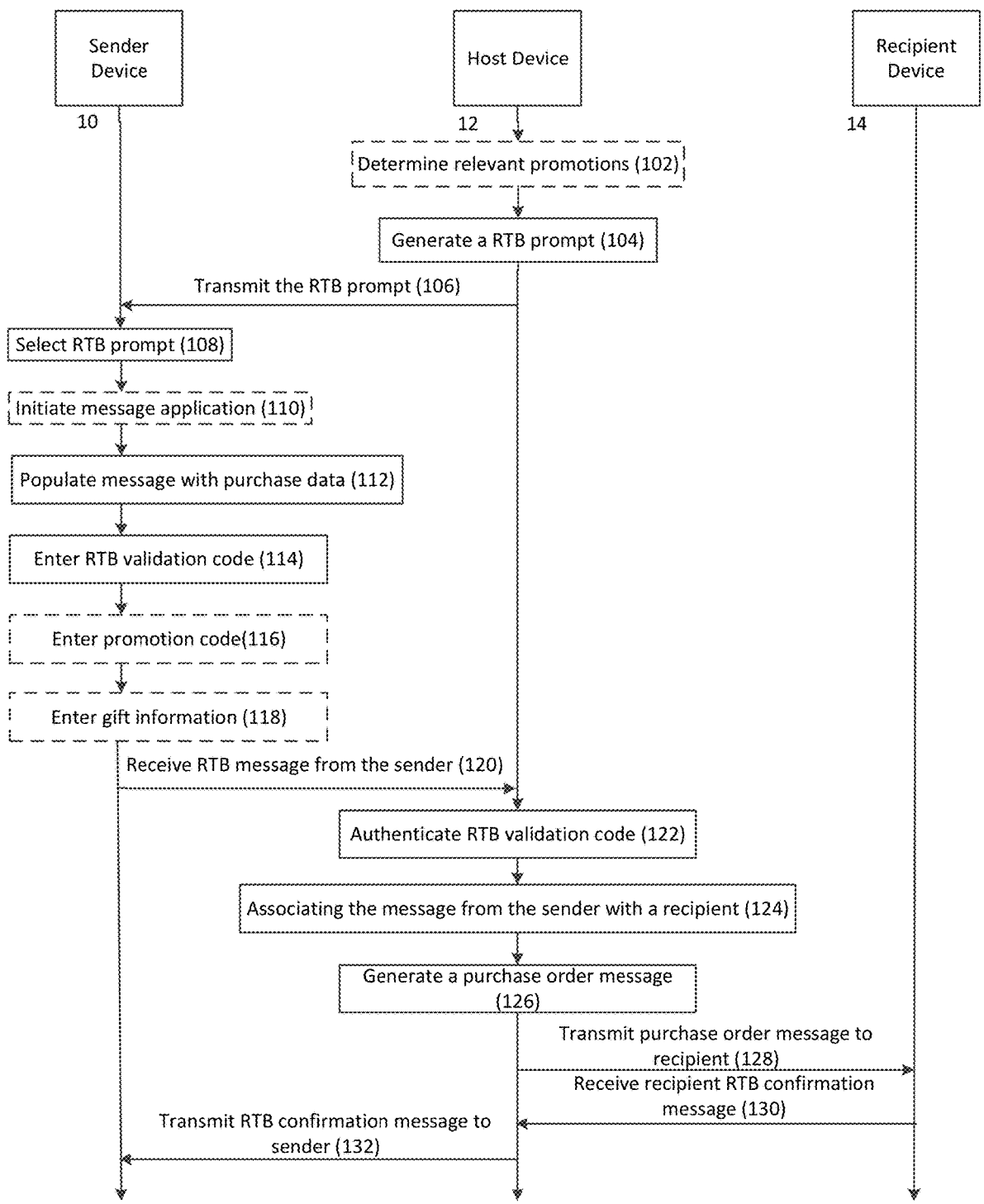
Figure 1B:
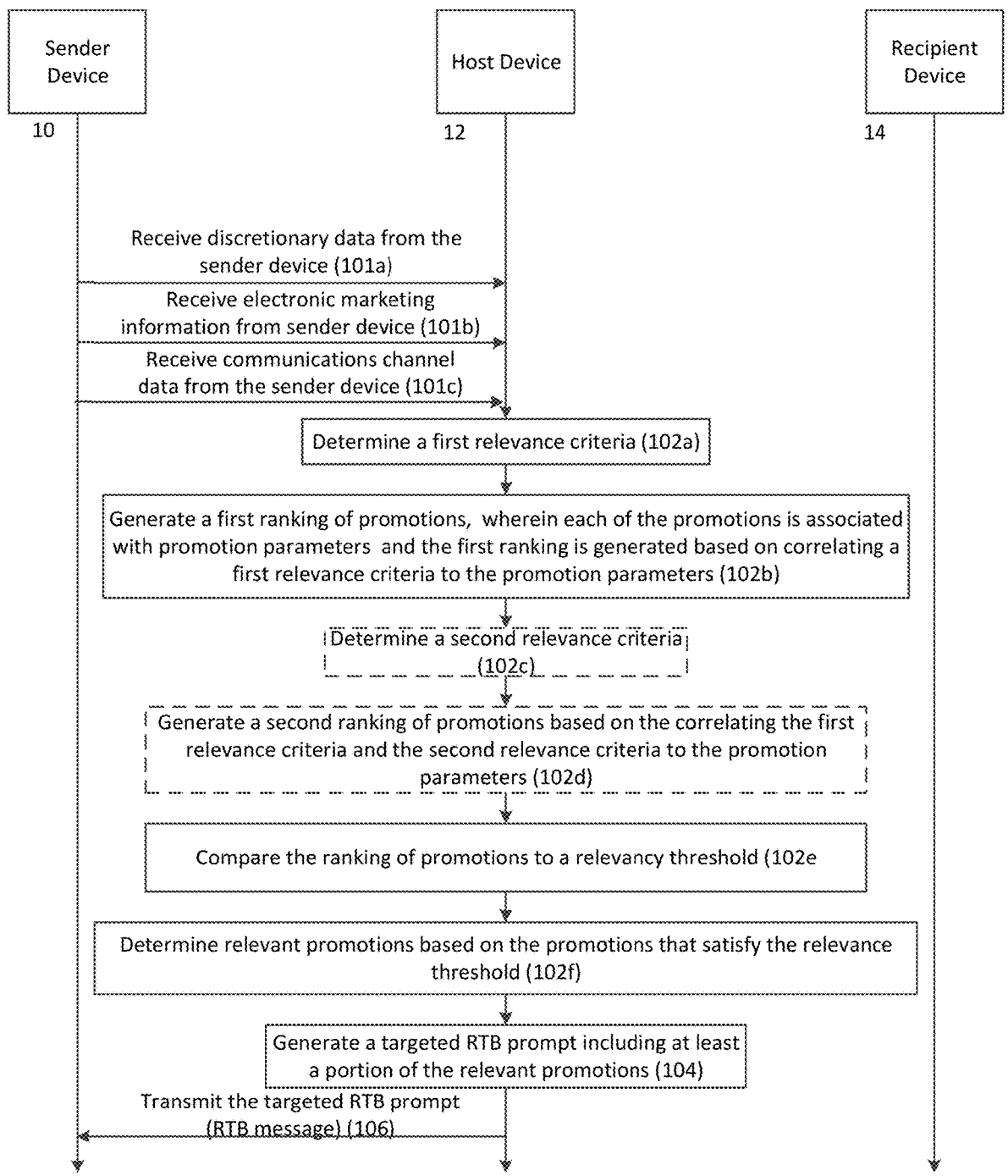
Figure 1C:
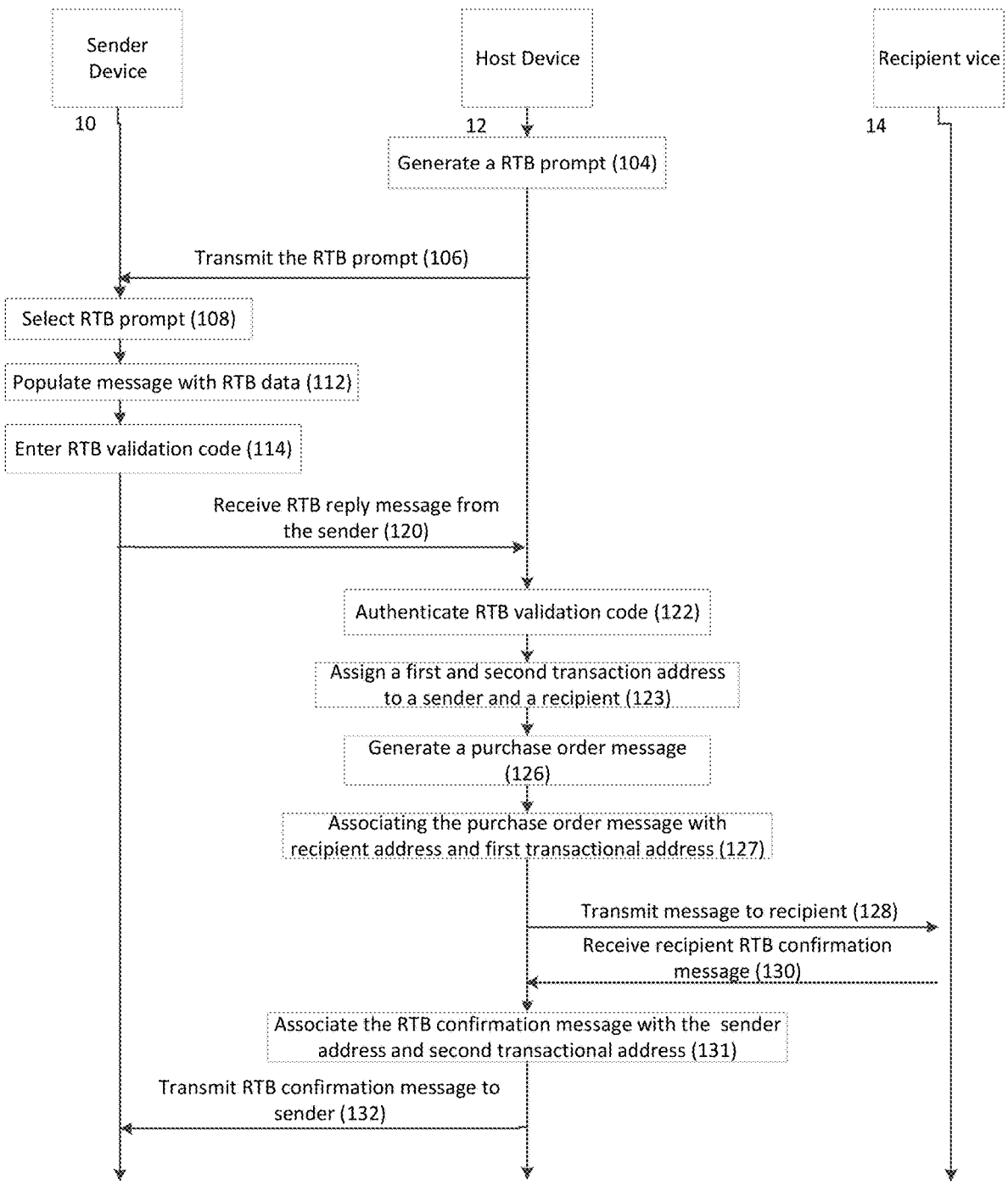
Figure 2:
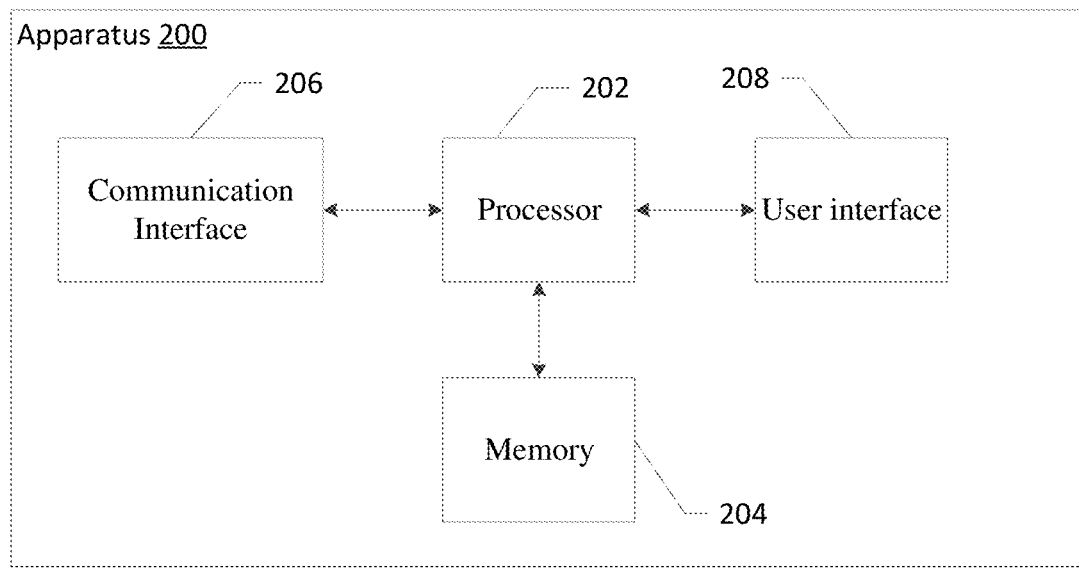
Figure 3:
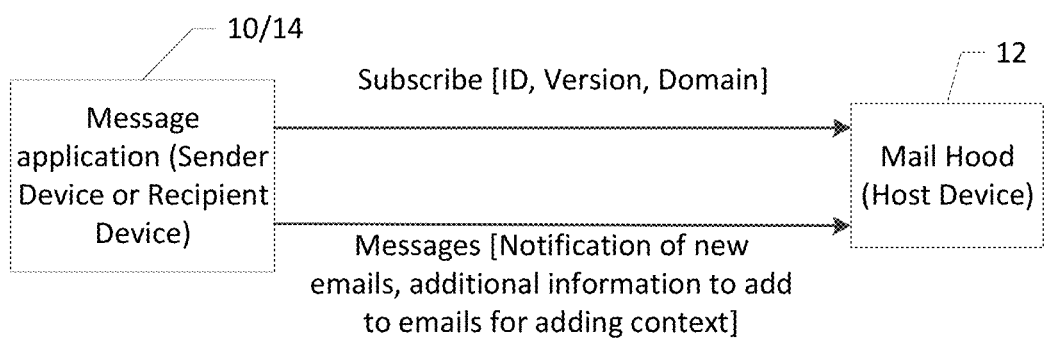
Figure 4:
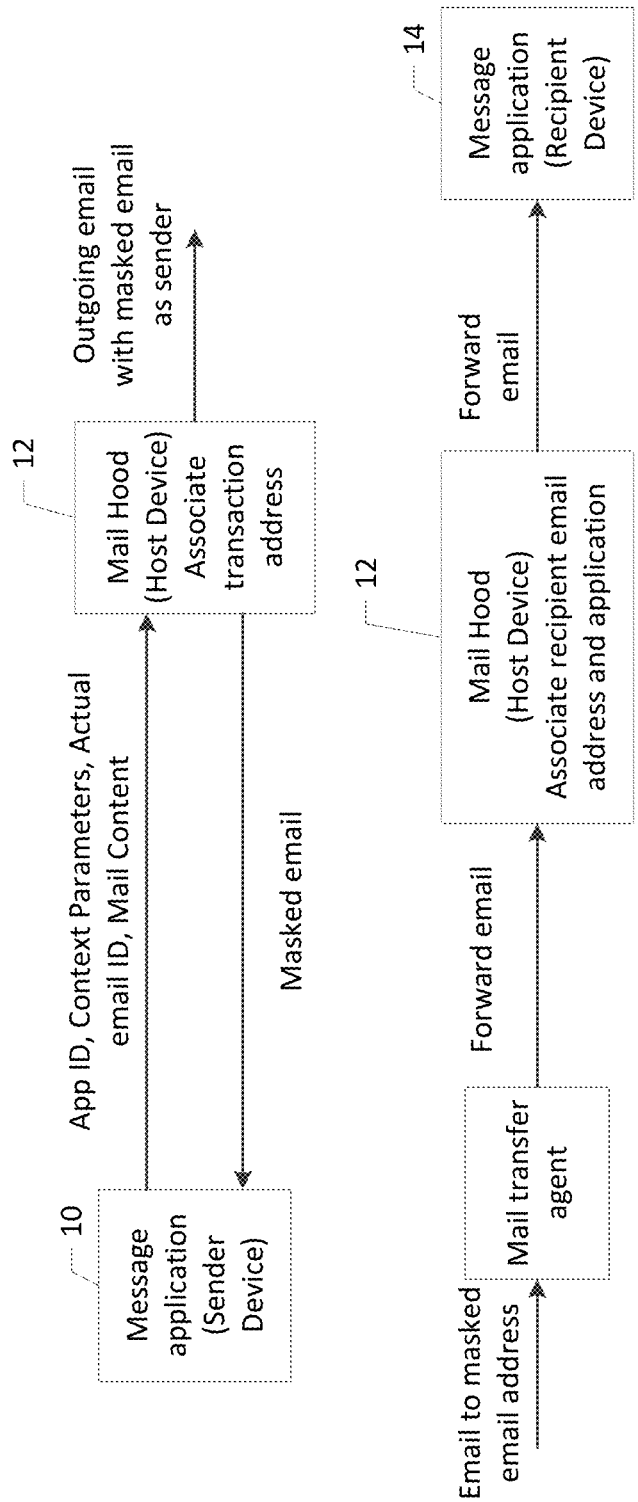
Figure 9:
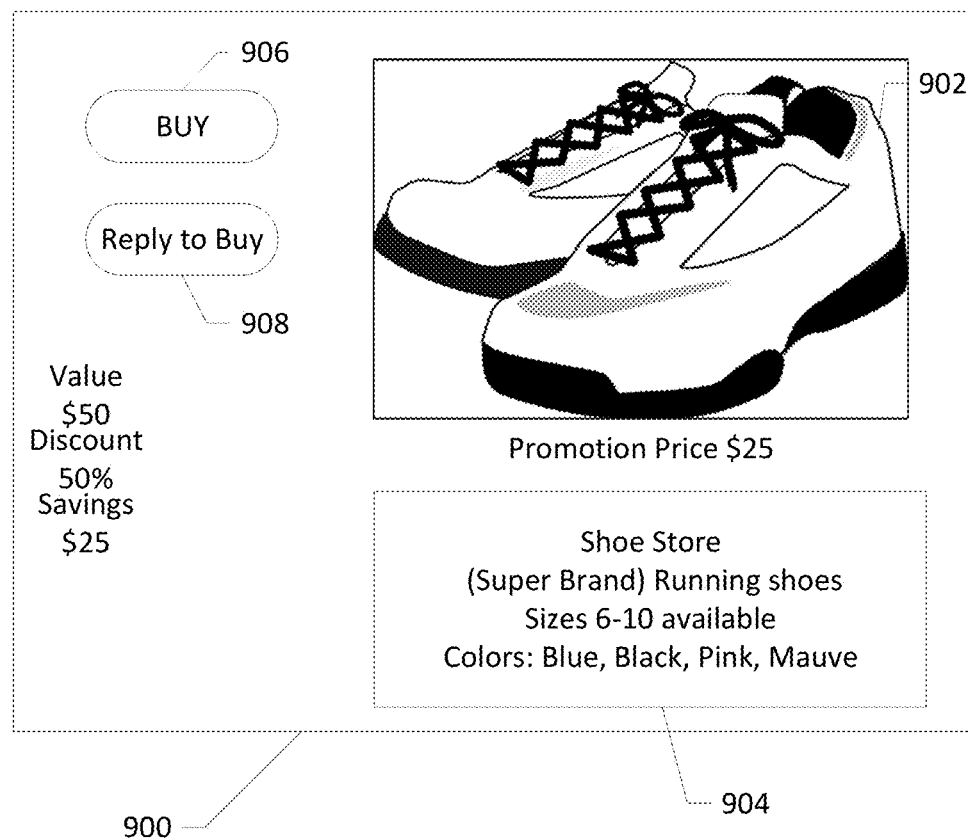
Figure 10A:
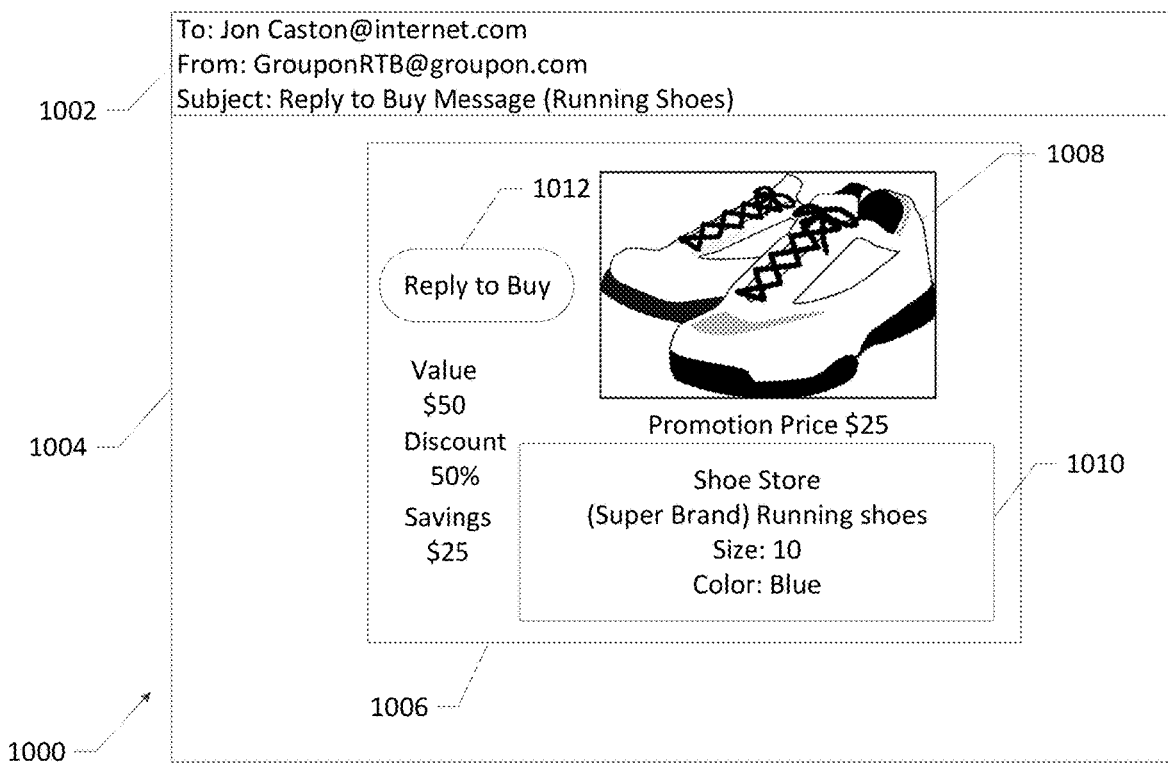
Figure 10B:
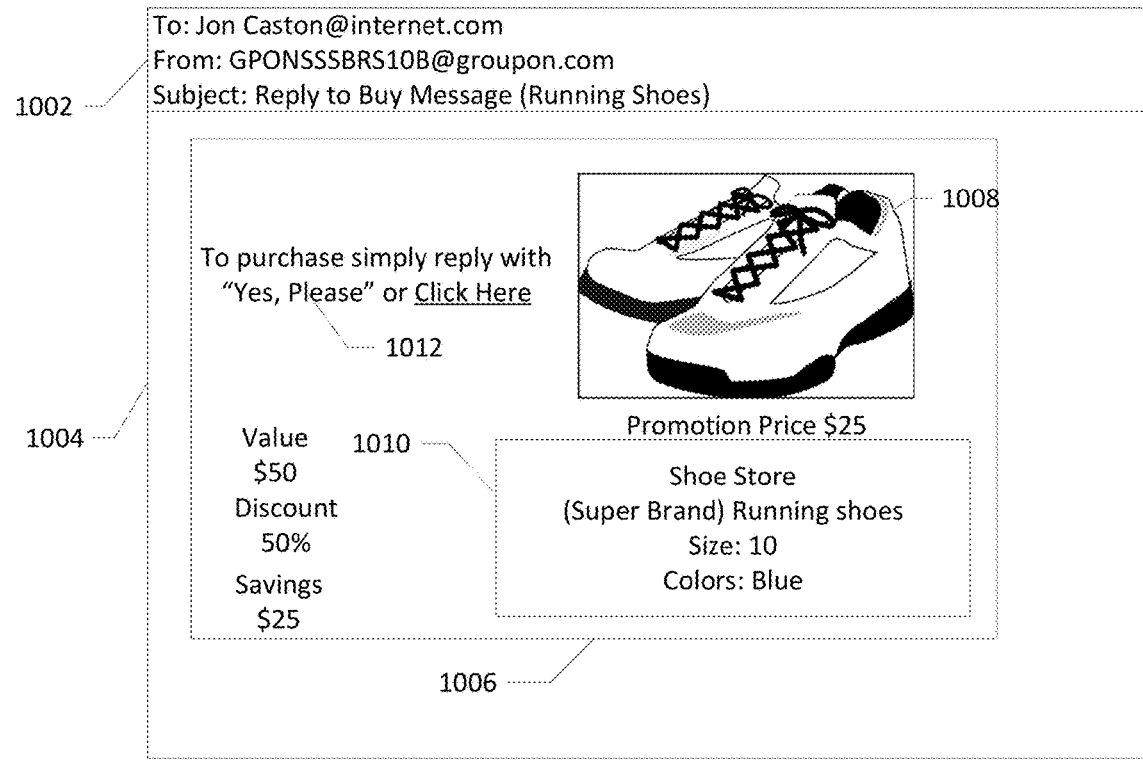
Figure 11:
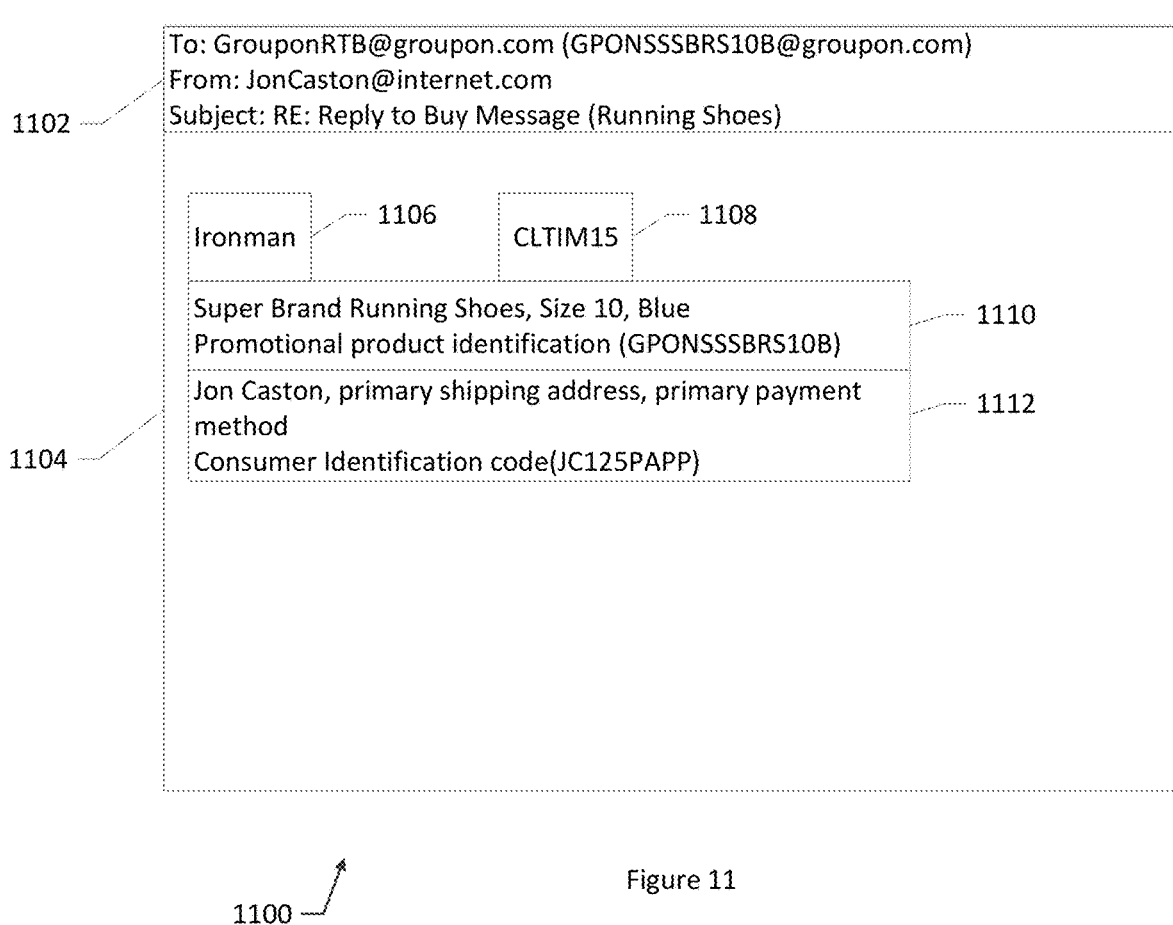

Having thus described example embodiments of the invention in general terms, reference will now be made to the accompanying drawings, which are not necessarily drawn to scale, and wherein:

FIG. 1A-1C illustrate data flow paths for reply to buy messaging in accordance with an example embodiment of the present invention;

FIG. 2 is a block diagram of an apparatus that may be specifically configured for electronic transactions based on a reply message in accordance with an example embodiment of the present invention;

FIG. 3 illustrates an example data flow from a sender or recipient message application to a host in accordance with some example embodiments of the present invention;

FIG. 4 illustrates an example data flow path from a sender message application to a recipient message application in accordance with some example embodiments of the present invention;

FIGS. 5-8 are flow charts illustrating operations performed, such as by the apparatus of FIG. 2, in accordance with an example embodiment of the present invention;

FIG. 9 illustrates an example electronic marketing communication including an RTB prompt in accordance with an example embodiment of the present invention;

FIGS. 10A and 10B illustrate example RTB messages in accordance with an example embodiment of the present invention; and FIG. 11 illustrates an example RTB reply message in accordance with an example embodiment of the present invention.

DETAILED DESCRIPTION

Definitions

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the term "provider" and "merchant" may be used interchangeably and may include, but is not limited to, provider, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example a provider may be a running company that sells attire for use by a person who runs or participates in athletic activities.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like. For example, and using the aforementioned running company as the example provider, a consumer may be an individual who is interested in purchasing running shoes.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion.

Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion. Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate name, interests, hobbies, their age, gender, location (e.g., "home", "work", or other visited places such as future vacation locations, cities that friends and/or family live in locations, business trip locations, or the like), relationship status, dependents, occupation, educational background, or the like. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed.

For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion leads (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

Various embodiments of the present invention may streamline or improve the electronic processing of online purchase operations. Some current electronic commerce system provide consumers with advertisements and product purchase platforms which may necessitate the consumer entering transaction information, such as personal information, billing information, product information, or the like. The repeated transmission of the transaction data produces a security risk for transaction signals and messages being intercepted and used for fraudulent purposes. This may be exacerbated by the fact that most consumer transactions are conducted over unsecured communication methods. Additionally, consumers may be disinclined to complete the transaction due to the time and effort needed to enter the transaction information and/or the sensitive information that is transmitted. In some example embodiments of the present invention a method, apparatus, or computer program product is provided that may allow a consumer to respond to a reply to buy (RTB) prompt or RTB message with a reply message, which may be associated with the consumers profile stored at a promotion and marketing service host device, e.g. host device, therefore allowing the transaction to take place without entering the transaction information in conjunction with the purchase. The RTB prompt may be associated with a RTB identifier that may populate the RTB reply message upon selection. The RTB identifier may indicate the promotion which is offered for purchase, for example, that RTB identifier may be a RTB message address, associated with a promotion for running shoes. Additionally or alternatively, the RTB identifier may be entered into the reply message body, or other fields, such as an email header, possibly as a recipient email address.

The consumer may enter a predetermined RTB validation code into the RTB reply message to indicate the intent to purchase the promotion associated with the RTB identifier and/or the consumer profile. In some embodiments, the RTB validation code may be predetermined by the host device or self-selected by the consumer. The utilization of an RTB validation code, provides a secure method for the consumer to convey their intent to purchase the promotion in association with the RTB identifier without entering and transmitting additional transaction information.

A host device may receive the RTB reply message from the consumer device and parse the RTB identifier, RTB validation code, and other data from the RTB reply message and process the reply message. Processing the RTB reply message may include associating the message with the consumer profile and authenticating the RTB validation code. Once the RTB validation code has been authenticated, the host device may associate the message with a provider profile and retrieve promotion details based on the RTB identifier. In response, the host device may generate purchase order based on the provider data and the promotion details, and may send a purchase order to the associated provider device.

The provider may receive the purchase order at a provider device and generate and subsequently send a RTB confirmation message to the host device, which may then send the RTB confirmation message to the sender device based on the consumer profile data.

In an example embodiment, the host device may determine relevant promotions based on discretionary data, electronic marketing information, communication channel data, promotion parameters, or the like. The host device may send a targeted RTB message to the sender device based on the relevant promotions. The RTB message may be email, text message, social media message, or any other type of two way electronic communication. The RTB message may include the RTB prompt as a selectable link, or the RTB identifier may be incorporated into the RTB message reply address.

In some example embodiments, the promotion and marketing service host may add additional security by obfuscating the message addresses from the sender device and/or the recipient device for some or all of the messages in the RTB process. In this example embodiment, the host device may assign a first transaction address to the sender device and a second transaction address the recipient device. The purchase order message may be associated with the first transaction address and sent to the recipient device. Similarly, the RTB confirmation message may be associated with the second transaction address and sent to the sender device. The obfuscation of message addresses may also allow for simplified transaction administration, e.g., each transaction may have a unique address for the sender and or recipient, and allow anonymity to the consumers.

Reply to Buy Data Flow Path

FIGS. 1A-1C illustrate data flow paths for reply to buy messaging in accordance with an example embodiment in the present invention. Data may be transmitted, received and/or manipulated by a sender device 10, a host device 12, e.g. host device, or a recipient device 14. The sender device 10 or the recipient device 14 may be a mobile computing device such as a laptop computer, tablet computer, mobile phone, smart phone, personal data assistant (PDA), or the like. Additionally or alternatively, the sender device 10 or receiving device 14 may be a fixed computing device such as a personal computer, computer workstation, kiosk, office terminal computer or system or the like. The host device 12 may be a mobile computing device, fixed computing device, computer network, e.g. server or the like. As illustrated in FIG. 1A, the host device 12 may determine relevant promotions at step 102. The host device 12 may determine relevant promotions based on promotion parameters, such as offering parameters, redemption parameters, promotion content, promotion components, or the like. In some example embodiments the host device 12 may also determine relevant promotions based on discretionary data, electronic marketing information, and communications channel data, or the like received from the sender device 10. The relevance determination process is discussed in further detail in FIG. 1B.

The host device 12 may generate a RTB prompt at step 104 based on one or more relevant promotions. The RTB prompt may be a link associated with a message address. In an example embodiment, the RTB prompt may be a portion of or otherwise associated with an electronic marketing communication, such as an electronic advertisement of a promotion, for example a promotion on the Groupon™ website, or mobile application. The RTB prompt may include a RTB identifier associated with a specific promotion. The RTB identifier may be any combination of characters, such as letters, numbers or symbols, which may identify a promotion. For example, the RTB identifier may be a number, such as 45683, a promotion code, such as GPONSSSBRS10B, or the like. In some example embodiments the RTB identifier may be a portion of a message address. The RTB identifier may have a validity period associated with the promotion, such as the RTB identifier may be valid only during the period when the promotion is valid. The host device 12 may transmit the RTB prompt to a sender device at step 106. In an instance in which the RTB prompt is not directly targeted to a consumer, the RTB prompt may be transmitted to server or database, which may be accessed by a consumer, such as a website server or application server, for example Groupon.com, or Groupon mobile application. In an instance in which the RTB prompt is targeted to a specific consumer or group of consumers, the host device 12 may transmit the RTB prompt as a portion of an RTB message to the sender device 10.

A consumer may select a RTB prompt using an interface supported by a sending device 10 at step 108. The RTB prompt may be a web browser link, a short message service (SMS) link, an email link, or other message link associated with an electronic marketing communication.

In an instance in which the RTB prompt is presented in a web browser or mobile application, the sender device 10 may initiate a message application at step 110. For example, the consumer may select a link using an interface associated with the sender device 10, which may open an email application on the sender device 10 to respond to the RTB prompt.

In response to the selection of the reply to buy prompt, the sending device 10 may populate a RTB reply message with the RTB identifier at step 112. The RTB reply message may include SMS, email, social media message, or any other two way electronic communications. The RTB identifier may be populated into the message body, and in some example embodiments may include a promotion description. The promotion description may be useful to a consumer to verify that they are purchasing the correct promotion. An example RTB reply message is depicted in FIG. 11. In some example embodiments, the RTB identifier may be at least a portion of a message address, for example an email address.

A consumer may enter a RTB validation code in a RTB reply message at step 114, The RTB validation code may be entered into the RTB reply message body, the subject line of the message, or other field. The RTB validation code may be used by the host device 12 to verify the intent of a consumer to purchase the selected product or service. The RTB validation code may be a standard code such as "Yes, please" or a self-selected code selected by the consumer (e.g., "Iron-Man", "fluffy bunnies," or "T-Rex"). In an example embodiment, the RTB validation code may be a brand name used for marketing and/or may be associated with the product or service of the transaction. The process for assigning or selecting a RTB validation code is discussed in FIG. 5.

Additionally, at step 116, a consumer may enter a promotional code or discount code into the message. Similar to the RTB validation code the promotional code may be entered in the body of the RTB reply message, the subject line, or other field.

The consumer may enter gift information in to the RTB reply message at step 118. In an instance in which the product or services being purchased as a gift, the consumer may enter a name, message, address, profile identifier, or any other consumer identifier that may be used by the host device 12 to identify the gift recipient and gift information. In an example embodiment, the consumer may enter the gift recipient identifier in a carbon copy field, or insert "gift" into the subject line or body of the reply message to indicate additional gift information is to be processed as a portion of the transaction.

In an example embodiment, the consumer may identify other persons for a multiple person promotions, such as a dinner for four. The consumer may enter "other" followed by an information identifying the additional persons, or enter the additional persons addresses in the carbon copy field of the message, in a manner similar to gift information.

The sender device 10 may transmit the RTB reply message to the host device 12 at step 120. The host device 12 may parse the RTB reply message fields and identify the various data for processing, such as the, consumer identity data, such as sender message address or consumer identifier, RTB identifier, RTB validation code, promotional code, gift information, additional persons, or the like. The host device 12 may parse the RTB reply message based on information being entered or populated in predetermined fields, such as subject line contains RTB identifier, body contains RTB validation code, or the like. In an example embodiment, the host device 12 may parse the RTB reply message based on trigger words, such as "gift," "validation code," "others," or the like. In some example embodiments, the host device 12 may parse the RTB reply message by searching the message for character strings, such as RTB identifiers may consist of 16 characters, validation codes include 12 characters, or the like. Additionally or alternatively, the character strings may include a predetermined character, starting, ending or included within the character string. In some embodiments, particular types of messages are associated with the presence of particular characters included in the character string. For example, RTB identifiers may start with "$$," RTB validation codes may end with "!" or the like.

At step 122, the host device 12 may authenticate the RTB validation code. The host device 12 may associate the consumer identity data with a consumer profile and compare the RTB validation code received in the RTB reply message with the RTB validation code associated with the consumer profile. The consumer profile may be stored in a memory associated with or accessible to the host device 12, such as a consumer profile database or subscriber management database. In an instance in which the RTB validation codes match, the host device 12 may authenticate the RTB validation code and continue processing the RTB reply message. In an instance in which the host device 12 does not validate the RTB validation code, the host device 12 may terminate the processing of the RTB reply message, and may additionally transmit an improper validation message to the sender device 10, not shown. The improper validation message may prevent fraudulent purchases using the consumer's profile data. The RTB code validation process is discussed in further detail in FIG. 8.

In an instance when the RTB validation code is authenticated, the host device 12 may associate the message from the sender device 10 with a recipient, e.g. provider profile at step 124. The host device 12 may associate the message with the provider profile based on the populated message data, such as RTB identifier, provider identifier, or the like. The host device 12 may retrieve a recipient message address associated with the recipient device 14 for addressing transmission from the host device 12 to the recipient device 14.

The host device 12 may generate a purchase order at step 126. The host device 12 may retrieve product data associated with the promotion based on the RTB identifier pared from the RTB reply message, as discussed above at step 122. The product data may be stored in a promotion database or other memory associated with or accessible by the host device 12. The host device 12 product data may include promotion parameters, such as the good or service associated with promotion, promotion identifiers, product details, such as size, color, location, times or the like. The host device 12 may populate a purchase order message with product data, such as the product description, product code, promotion identifier, product details, or the like. The host device 12 may populate the purchase order with logistic data associate with the consumer, such as billing information, consumer name, consumer ID, shipping information, gift recipient name, or the like. In an instance in which a promotion code is identified in the RTB reply message, the host device 12 may validate the promotional code by comparing it to a promotional code or codes associated with the promotion and adjust the product billing price or other promotion parameters accordingly.

The host device 12 may transmit the purchase order message to the recipient "provider" device 14 at step 128. The recipient device 14 may receive the purchase order message and process the transaction. Processing the transaction may include transmitting a recipient RTB confirmation message.

The host device 12 may receive an RTB confirmation message from the recipient device 14 at step 130. The confirmation message may be addressed to the consumer or sender device 10. The host device 12 may transmit the RTB confirmation message to the sending device 10 at step 132. The host device 12 may associate the RTB confirmation message with the consumer profile, in an instance in which the consumer identifier is included in the RTB confirmation message. The host device 12 may address the RTB confirmation message to the sender device 10 using a sender device address associated with the consumer profile.

In an example embodiment, the host device 12 may additionally send the RTB confirmation massage to additional persons or gift recipients associated with the RTB purchase.

Additionally, as illustrated in FIG. 1B, the host device 12 may determine relevant promotions for targeting a specific consumer or group of consumers. The host device 12 may receive discretionary data from the sender device 10 at step 101*a*. The discretionary data may include consumer attributes, consumer search data, a consumer input proximity radius, or the like. The host device 12 may receive electronic marketing information from the sender device 10 at step 101*b*. The electronic marketing information may include click stream data, consumer purchase history, consumer historical location data, promotion impressions, location data, or the like.

The host device may receive communications channel data from the sender device 10 at step 101*c*. The communications channel data may include type of device, login credentials, or the like.

Additionally, the host device 12 may be associated with or have access to a promotion database. The host device may access or retrieve promotion information such as promotion parameters, promotion times, promotion locations, or the like. In some example embodiments, the host device 12 may have access to other information databases which may include without limitation map data, weather data, environment data, e.g. location association with a rural or urban environment, or the like.

At step 102*a*, the host device 12 may determine a first relevance criteria. The first relevance criteria may be determined by a predetermined hierarchy, may be based on aggregate consumer purchase history, may be based on discretionary data, such as a preferred criteria, or the like. The first ranking criteria may be any data included in the discretionary data, electronic marketing data, communication channel data, or the like.

The host device 12 may generate a first ranking of promotions at step 102*b*. The host device 12 may generate the first ranking of promotions by correlating the first relevance criteria with promotion parameters associated with each promotion.

In an example embodiment, the host device 12 may use the number of consumers associated with a consumer, such as relationship status, number of children or dependents, or the like to generate the first ranking of promotions. The host device 12 may provide promotions for which the promotion parameters are conducive to multiple consumers, such as dinner for two, tea for four, buy two get one free. The processor 202 may also generate a first ranking of promotions in which the promotion parameters of the promotions are specified for a single consumer, but there is multiple availability, such as haircut for $10 with four available times. The host device 12 may exclude promotions which are for groups smaller than the number of consumers associated with the consumer.

In an example embodiment the relevance criteria may be a real time provider notice. The host device 12 may generate a first ranking of promotions based on the real time provider notice. A provider may have a slow period of business and provide a real time notice that consumers may receive a promotion within a short specified time period. For example, a provider may provide a real time notice for a late lunch special at 3 in the afternoon, with a one hour duration. The host device 12 may provide the promotion during the promotion period.

In an example embodiment, the relevance criteria may be a consumer attribute from a consumer profile. The consumer profile may be stored in a database associated with or otherwise accessible to the host device 12, such as the consumer profile database or subscriber management database. The host device 12 may receive the consumer attribute from the database. The host device 12 may use the consumer attribute to generate a first ranking of promotions. The consumer profile parameters may include, gender, age, race, group affiliations, relationships with other consumers, preferences, important dates, such as anniversaries and birthdays, or the like. The host device 12 may use one or more of the consumer attributes to generate the first ranking list. For example, the host device 12 may use an important data, such as a birthday of a spouse and historical location data, to provide promotions for gifts or services that could be used as a birthday present, such as flowers for half off, jewelry, or the like.

In another example, the host device 12 may use a consumer attribute such as relationship data, for example, married or in a relationship to provide promotions that may be more desirable to a couple and not provide promotions that may be more desirable to a single person. For example, if the relationship data indicated that the consumer was married, the provided promotions may include promotions for romantic activities or couples activities such as dinners, events, or the like for couples. In the same example, the provided promotion may not include promotions targeted for singles, such as discounted drinks at a singles bar, or dating services.

In an example embodiment, the relevance criteria may be a consumer preference. The consumer preferences may be entered by a consumer as discretionary data or determined based on previous purchases, e.g. electronic marketing data. The consumer preferences may be stored in a data, such as a consumer profile database or subscriber management database. The host device 12 may receive the consumer preferences from the database. The host device 12 may generate a first ranking of promotions based on the consumer preferences to provide promotions in which a promotion parameter is preferred and exclude promotions in which a promotion parameter is not preferred. For example, the consumer preference may indicate that the consumer prefers Chinese food and does not prefer fast food, the provided promotions may include Chinese and other restaurants, but not include fast food restaurants.

In an example embodiment, the relevance criteria may be consumer search data. The host device 12 may use the consumer search data to generate a first ranking of promotions. The consumer search data may be any input into the search field. For example, the consumer may enter into the search field on the user interface associated with the sender device 10, "pizza". The host device 12 may provide promotions in which a promotion parameter is pizza or the provider location is associated with pizza. Further, the host device 12 may return results for when the consumer search data is misspelled, abbreviated, or is a partial entry. For example, the processor may provide promotions for "pizza" when the entered search criteria is "pissa", "pitza", "pizz" or "pizza".

In an example embodiment, the relevance criteria may be consumer input. The host device 12 may receive the consumer input from sender device 10 entered using a user interface associated with the sender device. The host device 12 may generate a first ranking of promotions based on the consumer input. Consumer input may be method of travel, time of day, day of the week, date, or the like in which the consumer wants to participate in a promotion. For example, the consumer may want to eat dinner at 6 pm. The host device 12 may exclude promotions from the first ranking list that end prior to 6 pm and/or start after 7 pm. In an example in which the consumer input is method of travel, the processor may adjust a proximity radius between the sender device 10 and promotions. For example, if the consumer is walking there may be a smaller radius than if the consumer was driving. In an example embodiment in which the consumer does not specify an alternative time or date, the processor 202 may use the current time and date and provide promotions which are currently available.

In an example embodiment, the relevance criteria may be promotion times. The host device 12 may use the promotion start and end times to generate a first ranking of promotions. For example, the host device 12 may only provide promotions that are currently available for purchase and/or redemption, and exclude promotions that have expired or have not started yet. In another embodiment, the processor may also use consumer input such as a date and/or time to generate a ranking of promotions. For example, the consumer may input a time and date of Feb. 1, 2014 at 12 pm. The host device 12 may provide promotions that are available during that time and date, e.g. start and end time of the promotion.

In another example, the host device 12 may use a purchase history to provide promotions similar to promotions including products or services that the consumer has previously purchased.

In an example embodiment, the relevance criteria may be the number of views of a promotion or provider location, e.g. impressions. The host device 12 may use the number of views of the promotion to generate the first ranking of promotions. In an example embodiment, the promotion may have a parameter to display the promotion a predetermined number of times, such as one, two, three or any other number of views. The host device 12 may provide promotions that have not exceeded the number of views. For example the provider may offer a larger discount for first time clients or first view of the promotion. In an example embodiment, the promotion may have a parameter which allows the display of a promotion after a predetermined number of views of an associated promotion or provider location. The promotion may be displayed if a consumer has viewed an associated promotion and not purchased or booked a promotion a predetermined number of times, such as two, three or any other number of views, indicating that the consumer may be interested in the promotion at a lower price. For example, if a consumer has viewed a promotion twice without purchase or booking, an associated promotion may be displayed with a lower price or alternative goods or services.

In an example embodiment, the relevance criteria may be weather data. The weather data may be received by the host device 12 from a weather database or entered by the consumer using the user interface associated with the sender device. The host device 12 may use the weather data to generate a first ranking of promotions. The weather may include the temperature, humidity, precipitation, cloud cover, sunrise and sunset, or the like. The host device 12 may provide promotions that may be more desirable in the current or predicted weather conditions. For example, in an instance in which the weather is warm and sunny, the host device 12 may provide promotions that occur outside, or have an outdoor option, such as outdoor sports and activities, patio dining, outdoor concerts, or the like. In an example, in which the weather is cold and cloudy, the host device 12 may provide promotions that occur indoors, such as dining in, theatre, indoor concerts and sporting events, or the like.

In an example embodiment, the relevance criteria may be the type of environment associated with the location, such as rural or urban. The host device 12 may use the environment data to generate the first ranking of promotions. The environment may adjust a proximity radius between the sender, e.g. consumer device location, and promotions. In an urban area the host device 12 may reduce the proximity radius due to density of the promotions and provider locations and the travel time required to reach more distant provider locations. In a rural area the host device 12 may increase the proximity radius due to the lower promotion and provider location density and the travel time to reach more distant provider locations.

In an example embodiment, the host device may determine whether to present promotion(s) by assigning a score to each of the promotions. Example methods for assigning scores to promotions are disclosed in U.S. patent application Ser. No. 13/411,502 and U.S. Provisional Patent Application No. 61/644,352, both of which are incorporated by reference herein in their entireties. The promotion score may be, for example, an indication of a probability that the consumer will purchase the respective promotion. In addition or alternatively, the promotion score may be a representation of a relevance the respective promotion has with the consumer.

In some embodiments, after promotions are assigned their respective promotion scores, the highest scoring promotions may be identified for inclusion in the RTB message. However, in some embodiments, the host device 12 may cause the processor 202 to further utilize a second relevance criteria at step 102c. The second relevance criteria may be specified by the consumer or the host device 12 after the generation of the first ranking. For example, the first relevance criteria may include pre-entered preferences, and historical data, the second relevance criteria may include updated relevance criteria, consumer input, change in consumer location, or the like.

In some embodiments, the sender device 10 and or RTB message may have limited space to display impressions. Accordingly, the host device 12 may generate a second ranking of promotions for presentation to the consumer at step 102 d, wherein the second ranking is generated based on the correlating the second relevance criteria to the promotion parameters of each of the promotions similar to generating the first ranking list discussed at step 102b.

In some embodiments, a number of impressions associated with promotions for inclusion in the RTB message may be set such that only the top number n of promotions having the highest promotion scores are included. In an example embodiment, a consumer may select to display more, less, or the next set of promotions using the user interface associated with the sender device 10. In other embodiments, only those promotions meeting a predefined threshold are included. The host device 12 may compare the second ranking of promotions to a relevancy threshold at step 102 e. The host device 12 may determine relevant promotions based on promotions that satisfy the relevance threshold.

Additional descriptions of relevance determination algorithms for identifying promotions relevant to a consumer that may be used alternatively or additionally are described in U.S. patent application Ser. No. 13/411,502, filed Mar. 2, 2012, titled "RELEVANCE SYSTEM FOR CONSUMER DEALS", U.S. patent application Ser. No. 13/829,581 entitled "PROMOTIONAL SYSTEM" and filed on Mar. 14, 2013, and U.S. patent application Ser. No. 12/776,028, now U.S. Pat. No. 8,355,948, titled "SYSTEM AND METHODS FOR DISCOUNT RETAILING" filed on May 7, 2010, the entirety of each is incorporated by reference herein.

A host device 12 may generate a targeted RTB message including the RTB identifier, at step 104. The RTB message may be email, SMS, social media messaging or any other two way communications message. The RTB identifier may be associated with a selectable link in the RTB message, such as the RTB prompt discussed in FIG. 1A. The RTB message may an electronic commerce communication with multiple promotions, each with a unique RTB identifier and/or RTB prompt. Additionally, the RTB identifiers may be associated with options associated with the promotions or promotion details, such as quantity, size, color, or the like.

In some example embodiments the RTB identifier(s) may be unique to the promotion and the consumer. The RTB identifier may be associated with or generated in a similar manner as transaction addresses discussed below in FIG. 1C.

The host device 12 may transmit the RTB message, e.g. targeted RTB prompt, to the sender device 10.

In another example embodiment illustrated in FIG. 1C, the host device 12 may obfuscate message addresses. The host device 12 may receive a RTB reply message from the sender device 10 at step 120 and may generate and assign a first transaction address to the sender or sender device 10 and a second transaction address to the recipient or recipient device 14 at step 123. The host device 12 may generate the transaction addresses based on sender message address, the recipient message address, the sender and/or recipient identifiers, RTB identifier, a date or time identifier, account identifier, or the like. In some instances the transaction address may be derived from the RTB reply message from the sender device 10. For example, a time stamp associated with the message may be used to encode the sender and/or recipient information.

The host device 12 may generate and assign the following transaction addresses:
first transaction address: 4868985506@hostcompany.com
second transaction address: 212700048@hostcompany.com Each transaction address includes a domain (hostcompany.com) associated with the company (e.g., promotion and marketing service) that operates host device 12. The local part of the transaction addresses (i.e., 4868985506 and 212700048 respectively) were determined by using a RTB identifier to hash respective identifiers associated with the consumer and the provider. In particular, promotion and marketing host 12 assigned RTB number 45683 (i.e., RTB identifier) to the RTB message and then multiplied this transaction number by a sender identifier (e.g., consumer account number 106582) to obtain the local part of the first transaction address (i.e., 4868985506). Similarly, the host device 12 multiplied the RTB identifier 45683 by a recipient identifier (e.g., provider number 4656) to obtain the local part of the second transaction address (i.e., 212700048).

In some example embodiments, the host device 12 may generate the transaction addresses by encoding sender and/or recipient message addresses, such as email addresses, and at least one of the sender and/or recipient identifier, recipient group identifier, a RTB identifier, a date and/or time identifier, an account identifier, or the like. The encoding may be a hashing function of the respective email address and identifier. For example, the local portion of the email address may be translated and added to the identifier as a numeric value. One such translation may be numeric substitution of non-numeric characters based on alphabetic sequence, e.g. a=1, b=2, c=3, etc., for example "consumer1234" may be translated to 315141921135181234. One skilled in the art would appreciate that the hashing function may be performed by other mathematical operations, such as subtraction, multiplication, division, or the like or by more complex methods.

$$f(x)=\text{sender address identifier}+\text{identifer}(x)$$

$$f(x)=\text{receipient address identifer}+\text{identifer}(x)$$

Using the above equation, the example sender address identifier (e.g. consumer1234=315141921135181234 may be added to the RTB identifier (e.g. 45683) resulting in a transaction address local portion of 315141921135226917. The local portion may be appended to the host domain to result in a first transactional address 315141921135226917@hostcompany.com. Continuing the example, provider4567@groupon.com may be hashed as discussed resulting in a second transaction address of 116181522945230250@hostcompany.com.

In an example embodiment, the encoding may be based on a cryptographic hash function, such as secure hash algorithm 1 (SHA1), utilizing the alphanumeric representations of the transaction and user (e.g. consumer or provider identifiers). The cryptologic hash function may hash stringified representations of the data structure containing the alphanumeric identifiers. The stringified representation may be the binary language for the transaction or user identifier converted to alphanumeric text for the hashing process. The resulting stringified hashed representation may be utilized as the local portion of the transactional address.

Encoding the email address identifier and respective second identifier by hashing is illustrated as an example, it will be appreciated that any encoding method which obfuscates the message identifier of the sender and recipient could be used, such as substitution, or more complex encoding processes.

The host device 12 may assign a transactional address to the sender or sender device 10 and a transactional address to the recipient or recipient device 14. The host device 12 may identify subsequent messages based on the sender and/or recipient transactional address or identifiers. The host device 12 may assign the transaction addresses prior to sending the RTB message, or may assign transaction addresses after receiving a reply message from the sender device 10.

The transaction addresses may be assigned for a transaction period such as a single transaction, transaction group, or the like. The transaction addresses may be valid for the transaction period. In an example, the transaction addresses may be assigned for the duration of a transaction, such as from the request or purchase of the good, service, or promotion, until redemption. In this example, the transaction period may be terminated in response to the completion of the transaction.

In an example embodiment the transaction addresses may be assigned and valid for a time period associated with the transaction, for example a period before and after the transaction, or in an instance in which the transaction would not have a natural expiration such as completion of a purchase or participation in a purchased event. In an example, the transaction addresses are assigned for a predetermined period after the redemption or competition of the transaction to allow for feedback, inspections, questions about the product or service, or the like. In an example in which a consumer or provider is requesting information about a review, the transaction addresses may be assigned to the transaction of information for a predetermined period, such as one week, one month, or any other period of time.

In an example embodiment, the sender and/or the recipient may extend the transaction period, thus extending the validity of the transaction addresses by contacting the host device 12. For example, the consumer or provider may desire to extend the transaction period associated with the transaction addresses to resolve issues arising from the transaction, conduct a related transaction, or the like.

The host device 12 may associate the purchase order message with the transaction address of the sender device 10 at step 127. The host device 12 may identify the sender transactional address using the RTB identifier, sender message address, such as email address, sender identifier, or the like. The sender transactional address may be retrieved from the subscriber management database, consumer profile database, or other data storage. The host device 12 may associate the purchase order message with the sender transactional address by entering or substitution of the sender transactional address into the sender field of the message. For example, the sender address consumer1234@groupon.com may be substituted with 315141921135226917@hostcompany.com.

The host device 12 may identify and retrieve the recipient message address based on the RTB identifier, recipient transactional address, sender transactional address, or the like. The host device 12 may populate the recipient field with the recipient message address.

The host device 12 may transmit the purchase order message to the recipient device 14 using the transactional address of the sender (e.g. 315141921135226917@hostcompany.com) and email address (e.g. provider4567@groupon.com) of the recipient.

The recipient device 14 may respond to the sender by generating a RTB confirmation message at step 128 in which the sender's transactional address or sender identifier is used in the recipient field. The recipient device 14 may fill the recipient and sender fields based on the message received from the host device 12. For example, the sender field may be the recipient address (e.g. provider4567@groupon.com) and the recipient field may be the sender transactional address (e.g. 315141921135226917@hostcompany.com). The host device 12 may receive the RTB confirmation message from the recipient device 14 to the sender device 10 at step 130.

The host device 12 may associate the RTB confirmation message from the recipient device 14 with the transactional address associated with the sender device 10 at step 131. As discussed above, the host device 12 may identify the transactional address and email address of the sender 10 and recipient 14 respectively. The host device 12 may substitute the email address (e.g. provider4567@groupon.com) of the recipient 14 with the transactional address (e.g. 3818916456@hostcompany.com) associated with the recipient. The host device 12 may also substitute the transactional address (e.g. 315141921135226917@hostcompany.com) of the sender 10 with the sender's email address (e.g. consumer1234@groupon.com) retrieved from a memory, such as a subscriber management database or consumer profile database.

The host device 12 may transmit the RTB confirmation message from the recipient device 14 to the sender device 10 using the transaction addresses and email addresses as described above.

The obfuscation of email addresses in both directions of communications allows for the email addresses to be used for the course of the transaction without risk of loss of privacy to the email or other message application account holders. Further, the use of the transaction addresses creates a distinguishable communication chains associated with the transaction.

Example Apparatus

The sender device 10 or host device 12 may be embodied or otherwise associated with an apparatus, such as apparatus 200 shown in FIG. 2. As illustrated in FIG. 2, the apparatus 200 may include a processor 202, a memory 204, a communications interface 206, and a user interface 208, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the communications interface 206 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Meanwhile, the apparatus 200 may include a user interface 208 that may, in turn, be in communication with processor 202 to provide output to the user and, in some embodiments, to receive an indication of a user input. As such, the user interface 206 may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor 202, or user interface circuitry comprising the processor 202, may be configured to control one or more functions of one or more user interface elements through computer program instructions (e.g., software and/or firmware) stored on a memory accessible to the processor (e.g., memory 204, and/or the like).

Example Data Flow from a Message Application to the Host

Referring now to FIG. 3, the data flows from a sender device 10 or recipient device 14 message application to the host device 12 are illustrated. The message application may be a MUA or a web form. The following illustration is made from the sender perspective; however one skilled in that art would understand that the process may be performed similarly for the recipient perspective. The sender device 10 may send information to the host device 12 to identify the sender and their associated message address, such as an email address or a consumer/provider identifier, or the like. In some embodiments, the sender provides only contact information such as an email identifier (local portion), domain, and the version of the message application. The local portion, domain, and version may be derived from the transmission of an email.

In another example, the sender may provide further information such as name, age, phone number, alternate email addresses, preferences, relationship status, or the like. The additional information may be derived from a subscription to a service, creation of an online account or user profile, or the like.

The host device 12 may use the sender email address local portion, domain, and application version in the generation of transaction addresses as discussed in FIG. 1C. Further, the host may store the sender email address local portion, domain, application version, or the like in a memory, such as a subscription management database or consumer profile database, and may associate the information with a user profile.

The sender device 10 or recipient device 14 message application may transmit messages to the host device 12 for transmission to the respective recipient, as described in FIG. 1C.

Example Data Flow from a Sender Message Application to a Recipient Message Application FIG. 4 illustrates example data flow paths from a sender message application to a recipient message application. The sender device 10 message application may transmit a message to the host device 12. The message may include a message application identifier, message context parameters, the sender's email address, including sender email identifier, the message content, or the like.

The host device 12 may receive the RTB reply message and associate the transaction address associated with the sender with the RTB reply message. The host device 12 may substitute the sender's email address with the transaction address, as discussed in FIG. 1C. The host device 12 may generate the purchase order message including the associated transaction addresses. The purchase order message may then be transmitted by the host device 12 using the transaction address associated with the sender and the message address associated with the recipient.

In an example embodiment, the transaction addresses may be generated and assigned prior to transmission of the RTB message. The host device 12 may utilize the transaction addresses for any or all transmissions between sender device 10 and the recipient device 14.

In an example embodiment the host device 12 may be separate hosts for the sending and receiving of messages, utilizing common transaction address data. The purchase order message may be relayed through one or more message transfer agents (MTAs) before or after the respective host devices 12. The MTA may transmit the purchase order message to the host device 12. The host device 12 may receive the purchase order message from the MTA and identify the recipient based on the recipient transaction address. The host device 12 may identify the recipient email address and recipient message application and associate the message with the recipient email address by substitution or entry of the recipient address in the recipient field of the purchase order message. The host device 12 may also format the message for compatibility with the recipient message application.

The host device 12 may send the purchase order message to the recipient device 14 using the recipient's message address. Although FIG. 4 illustrates the data flow from the sender device 10 to a recipient device 14, it should be appreciated that the process may also be used to transmit a confirmation message from the recipient device to the sender device as discussed in FIG. 1C.

Example Process for Assigning an RTB Validation Code

Figure 5:
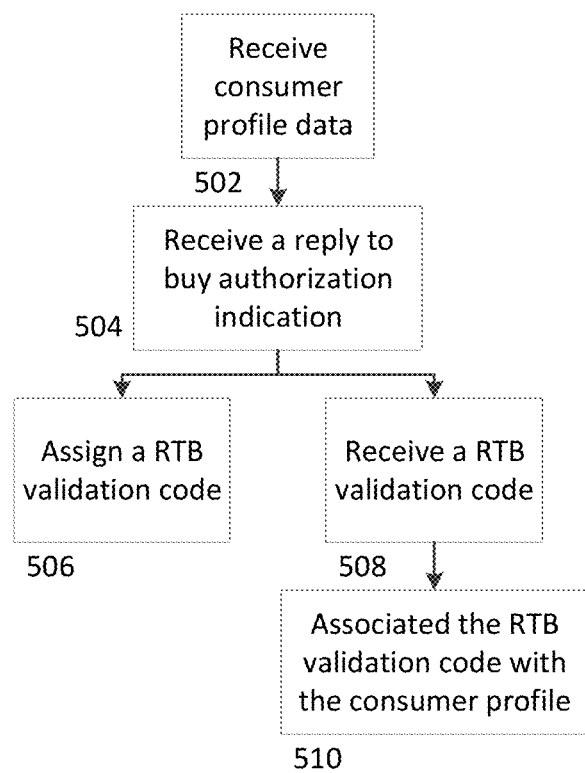

Now referring to FIG. 5, the operations performed such as by an apparatus 200 in FIG. 2 for assigning an RTB validation code are illustrated. As shown in Block 502, the apparatus 200 may include means, such as a processor 202, a communications interface 206, or the like, configured to receive discretionary data, such as customer profile data. Consumer profile data may include consumer name, age, occupation, income, relationship status, sexual orientation, hobbies, preferences, dependent status, interests, gender, or the like. Consumer profile data may additionally include primary shipping addresses, billing addresses, payment methods, account numbers, or the like. The processor 202 may receive the consumer profile data from the communication's interface 206 which may in turn receive the consumer profile data for the sender device 10. The processor 202 may store the consumer profile data in the memory 204, such as a subscription management database or consumer profile database.

As shown in Block 504 of FIG. 5, the apparatus 200 may include means, such as a processor 202, a communications interface 206, or the like, configured to receive a RTB authorization indication. The processor 202 may receive a RTB authorization indication from the communications interface 206 which in turn receives the reply to buy authorization indication from a sender device 10. The consumer may authorize RTB transactions by selecting a RTB authorization link, icon, or other method of indicating the consumer's consent to participate in RTB transactions. In an instance in which the RTB validation code is generated by the promotional marketing servicing host, such as promotion marketing service host 12, the process continues at Block 506. In an instance in which the consumer selects the RTB validation code, the process may continue at 508.

As shown in Block 506 of FIG. 5, the apparatus 200 may include means, such as a processor 202, or the like, configured to assign an RTB validation code. The RTB validation may be a general RTB validation code such as "Yes, please," the consumer's username, or the like. In an example embodiment, the RTB validation code may be used for marketing such as by generating and assigning RTB validation codes associated with brand names, such as Groupon™, or the like.

As shown in Block 508 of FIG. 5, the apparatus 200 includes means, such as a processor 202, a communications interface 206, or the like, configured to receive an RTB validation code. The processor 202 may receive the RTB validation code from the communications interface 206 which in turn receives the RTB validation code from a sender device, such as sender device 10. A consumer may enter a self-selected RTB validation code using the user interface of a sender device 10, the RTB validation code may be any combination of characters, including numbers, letters, or symbols which the consumer desires to use to authorize transactions. For example, "Go Dawgs," "John Rocks," "IronMan," or the like.

As shown in Block 510 of FIG. 5, the apparatus 200 may include means, such as a processor 202, a memory 204, or the like, configured to associate the RTB validation code with a consumer profile. The processer 202 may associate the RTB validation code with the consumer profile based on a consumer identifier. The processor 202 may store the associated RTB validation code in a memory 204, such as a subscription management database or consumer profile database.

Example Process for Electronic Transactions Based on Reply Message

Figure 6:
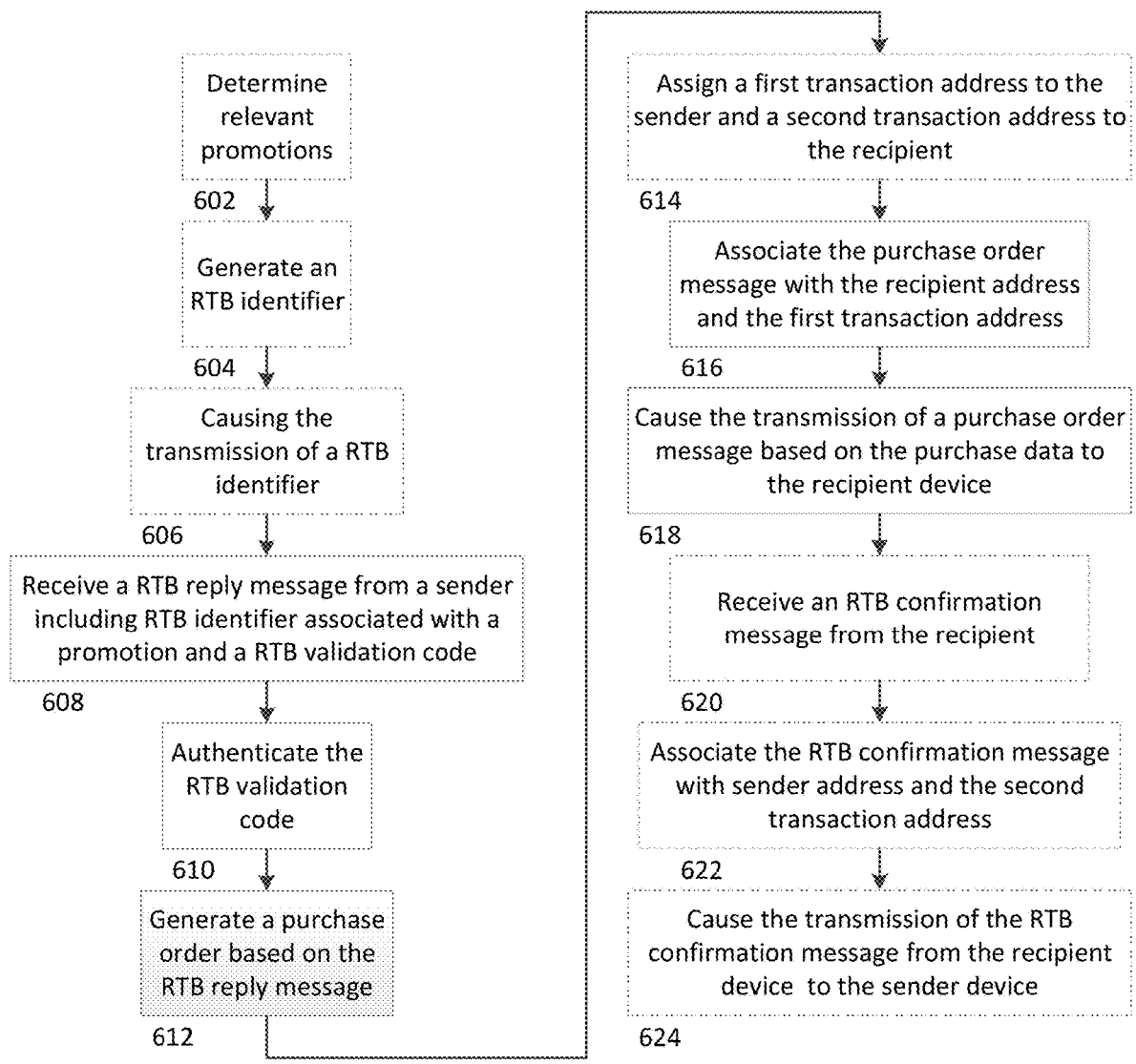

Referring now to FIG. 6, the operations performed, such as by an apparatus 200 of FIG. 2 for an electronic transaction based on a reply message are illustrated. As shown in Block 602 of FIG. 6, the apparatus 200 may include means such as a processor 202, a memory 204, or the like, configured to determine relevant promotions. In general, relevance may include an analysis to determine which promotions to offer to a consumer for a product or service.

The processor 202 may determine a first relevance criteria and generate a first ranking of promotions for presentation to the consumer. In some embodiments, each of the promotions is associated with promotion parameters. In some embodiments, the first ranking may be generated based on correlating a first relevance criteria to a promotion parameter of each of the promotions. The relevance criteria may include discretionary data, electronic marketing data, communications channel data, promotion parameter data, or the like. The processor 202 may retrieve relevance criteria from a memory 20, such as a promotion database, consumer profile database, or a subscription management database. The processor 202 may determine a second relevance criteria and generate a second ranking of promotions, in an instance in which the space for display is limited or to further refine the presented promotions. The processor 202 may assign scores to each of the promotions based on the first and or second rankings of promotions and compare the relevance scores to a predetermined relevance threshold. The processor 202 may determine relevant promotions based on the promotions satisfying the predetermined relevance threshold. Further discussion of determination of relevant promotion is provided above at FIG. 1B.

As shown in Block 604 of FIG. 6, the apparatus 200 may include means, such as a processor 202, or the like, configured to generate an RTB identifier. The RTB identifier may be any combination of characters, such as letters, numbers or symbols, which may identify the promotion. For example the RTB identifier may be a number, such as 45683, a promotion code, such as GPONSSSBRS10B, or the like. In an example embodiment, the RTB identifier may also be associated with a specific consumer or group of consumers. The generation of the RTB identifier associated with a consumer may include a consumer identifier appended to the RTB identifier or may be generated in a manner similar to generating a transactional address, as discussed in block 610.

As shown in Block 606 of FIG. 6, the apparatus may include means, such as a processor 202, a communications interface 206, or the like for causing the transmission of a RTB identifier. The processor 202 may generate a RTB prompt associated with a promotion, such as a link on a website or application which includes the RTB identifier. The processor 202 may cause the communications interface 206 to transmit an electronic marketing communication including the RTB prompt to a web server or application server which may be accessed by a consumer using a user device, such as sender device 10.

Additionally or alternatively, the processor 202 may generate an RTB message with a targeted RTB prompt including the RTB identifier as an email link, SMS link, social media message link, or the like associated with a promotion impression. In a further example embodiment, the processor 202 may generate a RTB message in which the RTB identifier is at least a portion of the RTB message address. Example embodiments of a RTB message are depicted in FIGS. 10a and 10b. The processor 202 may cause the transmission of the RTB message to a sender device, such as sender device 10.

As shown in Block 608 of FIG. 6, the apparatus 200 may include means such as a processor, a communications interface, or the like, configured to receive a RTB reply message from a sender including the RTB identifier associated with a promotion and a RTB validation code. The RTB identifier may populate the RTB reply message based on selection of the RTB prompt, or may be a portion of the RTB reply address. The RTB validation code may be any combination of characters, including numbers, letters and symbols associated with the consumer profile which indicates the consumer's intent to complete a transaction. The consumer may enter the RTB validation code into the message. The generation and transmission of the reply message from a sender device, such as sender device 10, is discussed in FIG. 7. The processor 202 may receive the RTB reply message from the communications interface 206, which in turn receives the message from the sender device 10.

The processor 202 may parse RTB reply message fields and identify the various data for processing, such as the, consumer identity data, such as sender message address or consumer identifier, RTB identifier, RTB validation code, promotional code, gift information, or the like. The processor 202 may parse the RTB reply message based on information being entered or populated in predetermined fields, such as subject line contains RTB identifier body contains RTB validation code, or the like. In an example embodiment, the host device 12 may parse the RTB reply message based on trigger words, such as "gift," "validation code," "others," or the like. In some example embodiments, the host device 12 may parse the RTB reply message by searching the message for character strings, such as RTB identifiers may consist of 16 characters, validation codes include 12 characters, or the like. Additionally or alternatively, the character strings may include a predetermined character, starting, ending or included within the character string, such as RTB identifiers start with "$$," RTB validation codes end with "!," or the like. In some embodiments, the gift information may be used to purchase a promotion for multiple persons. For example, a promotion for a dinner for four people may be purchased and the three additional persons may be identified using the gift information, which may initiate a confirmation message to the additional persons from the recipient device 14, discussed below at step 622.

As shown in Block 610 of FIG. 6, the apparatus 200 may include means, such as a processor 202, a memory 204, or the like, configured to authenticate the RTB validation code. The processor 202 may associate the reply message with a consumer profile stored in memory 204, such as a consumer profile database or subscriber management database. The processor 202 may compare the received RTB validation code to the RTB validation code associated with the consumer profile. The processor 202 may determine if a received RTB validation code matches the RTB validation code associated with the consumer profile. In an instance in which the RTB validation code does not match the RTB validation code associated with the consumer profile, the processor 202 does not validate the RTB validation code and terminates the transaction. In an instance in which the received RTB validation code matches the RTB validation code associated with the consumer profile, the processor 202 may validate and process the transaction. Authentication of the RTB validation code is discussed in further detail in FIG. 8.

In an embodiment, the processor 202 may cause the transmission of an improper validation message to the sender device 10, in an instance in which the authentication fails.

As shown if block 612 of FIG. 6, the apparatus 200 may include means such as a processor 202, memory 204, or the like, configured to generate a purchase order based on the RTB reply message. The processor 202 may retrieve product data associated with the promotion based on the RTB identifier parsed from the RTB reply message, as from a memory 204, such as a promotion database. The product data may include promotion parameters, such as the good or service associated with promotion, promotion identifiers, product details, such as size, color, location, times or the like. The processor 202 may populate a purchase order message with product data, such as the product description, product code, promotion identifier, product details, or the like. The processor 202 may populate the purchase order with logistic data associate with the consumer, such as billing information, consumer name, consumer identifier, shipping information, gift recipient name, or the like. In an instance in which a promotion code is identified in the RTB reply message, the processor 202 may validate the promotional code by comparing it to a promotional code or codes associated with the promotion and adjust the product billing price or other promotion parameters accordingly, if valid.

As shown in Block 614 of FIG. 6, the apparatus 200 may include means such as a processor 202, or the like, configured to assign a first transaction address to the sender device 10 and a second transaction address to the recipient device 14. The processor 202 may generate transaction addresses by encoding the message addresses of the sender and/or recipient with at least one of the sender or recipient identifier, RTB identifier, date and/or time identifier, an account identifier, or the like. In some instances, the identifiers and message addresses may be derived from the reply message as entered information elements. In some embodiments, the processor 202 may retrieve at least a portion of the information or addresses from memory 204, such as subscriber management database or consumer profile database, based on recipient or sender identifier or predetermined message address, as discussed above, in relation to FIG. 1C.

As shown in Block 616 of FIG. 6, the apparatus 200 may include means such as a processor 202, or the like, configured to associate the purchase order message with the recipient address and first transaction address. The processor 202 may use the recipient identifier, predetermined message address, sender message address, sender identifier, or the like to identify a transaction address associated with the sender. The processor 202 may associate the message with the sender or the first transaction address by substituting or entering a transactional address into the sender field in a message. For example, the sender address consumer1234@Groupon.com may be substituted with 315141921135226917@hostcompany.com. In the example embodiment, the processor 202 may also identify and retrieve a recipient address based on a RTB identifier, recipient transactional address, recipient identifier, or the like. The processor 202 may identify the sender's message address (e.g., consumer1234@groupon.com) and associate the transactional address (e.g., 315141921135226917@hostcompany.com) and substitute the sender's message address with the sender's transactional address.

In an instance in which transaction addresses are not used the processor may associate the recipient address with the purchase order message based on the RTB reply message or the recipient profile.

As shown in Block 618 of FIG. 6, the apparatus 200 may include means such as the processor 202, a communication interface 206, or the like, configured to cause a transmission of a purchase order message. The communications interface 206 may transmit the message to a MTA, MUA or other message server using recipient message address and use the first transactional address or sender address for the sender.

At Block 620 of FIG. 6, the apparatus 200 may include means such as a processor 202, a communications interface 206, or the like, configured to receive a RTB confirmation message from the recipient device 10. The confirmation message may include transaction data including shipping address, product information, product details, payment method, or the like, confirming the transaction has been received and is being processed by the recipient provider. The message may also include the recipient message identifier, application identifier, sender identifier, sender transaction address, or the like.

In an instance in which transaction addresses are not used the processor may associate the sender address with the RTB confirmation message based on the purchase order message or the sender profile.

As shown in Block 622 of FIG. 6, the apparatus 200 may include means such as a processor 202, or the like, configured to associate the RTB confirmation message with the sender address and the second transaction address. The processor 202 may identify the transaction address associated with the recipient based on the recipient message address, recipient identifier, RTB identifier, sender identifier, or first transaction address, or the like. The processor 202 may associate the RTB confirmation message with the second transaction address by entering or substituting the transaction address into the sender field of the RTB confirmation message.

For example, the processor 202 may substitute the email address (e.g. provider4567@groupon.com) of the recipient 14 with the transactional address (e.g. 3818916456@hostcompany.com) associated with the recipient. The processor 202 may also substitute the transactional address (e.g. 315141921135226917@hostcompany.com) of the sender 10 with the sender's email address (e.g. consumer1234@groupon.com) retrieved from a memory, such as a consumer profile database or subscriber management database.

As shown in Block 622 of FIG. 6, the apparatus 200 may include means, such as a processor 202, a communications interface 206, or the like, configured to cause the transmission of the RTB confirmation message from the recipient to the sender device 10. The processor 202 may cause the communications interface 206 to transmit the RTB confirmation message to the sender device 10 using the sender message identifier and the recipient message identifier or the recipient second transaction address.

Figure 7:
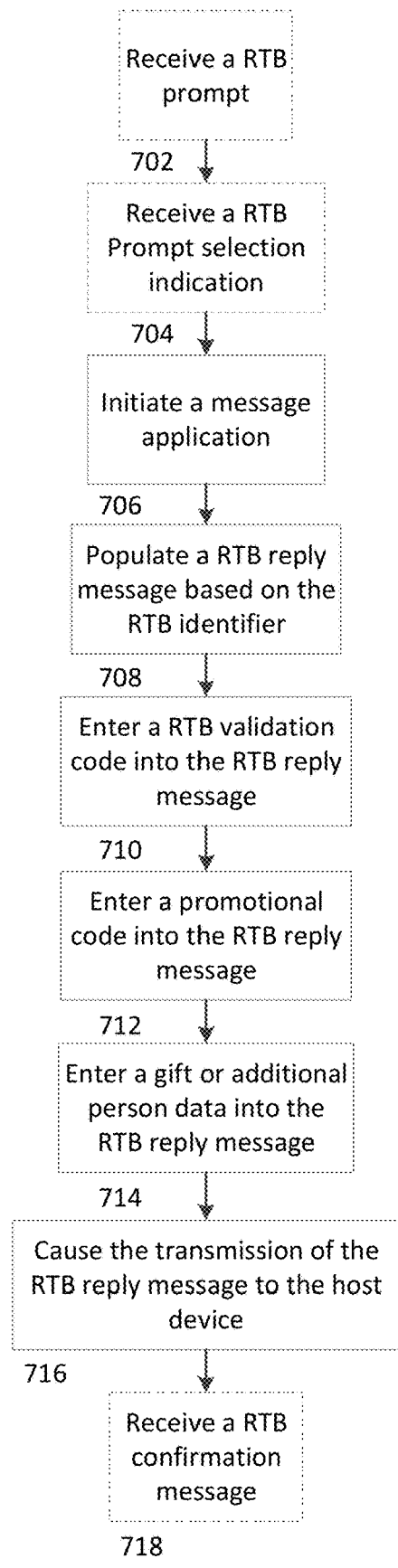

Example Process for Electronic Transactions Based on Reply Message from a Sender Device Referring now to FIG. 7, the operations performed such as by the apparatus 200 in FIG. 2 for electronic transactions based on a reply message are illustrated. As shown in Block 702 of FIG. 7, the apparatus 200 may include means, such as a processor 202, a communications interface 206, or the like, configured to receive a RTB prompt. In some example embodiments the RTB prompt may be included in the promotion description in a website or mobile application, such as a reply link. In an example embodiment, the RTB prompt may be received as a portion of an RTB message, or targeted RTB prompt. The RTB message may be an email, SMS message, social media message, or any other two-way electronic message. The RTB message may include an electronic marketing communication associated with one or more promotions and a selectable RTB prompt including a RTB identifier such as a reply link, for example a web browser link, a SMS link, an email link, a link in a social media message, or the like. In an example embodiment, the RTB message may include multiple RTB prompts, such as links associated with different shipping addresses, products, recipients, product details such as color, size, quantity, and/or payment information. Example RTB messages are depicted in FIGS. 10a and 10b.

Additionally or alternatively, the RTB message may include the RTB identifier as a portion of the RTB message sender address.

As shown in Block 704 of FIG. 7, the apparatus 200 may include means, such as a processor 202, a user interface 208, or the like, configured to receive a RTB prompt selection indication. A consumer may select a RTB prompt using the user interface 208, such as by clicking an RTB prompt link. The processor 202 may receive the RTB prompt selection indication from the user interface 208.

In an embodiment in which the RTB message address comprises a RTB identifier, the indication of the selected RTB promotion may be indicated by replying to the message. In this embodiment selection of a RTB prompt may not be necessary.

As shown, in Block 706 of FIG. 7, the apparatus 200 may include means, such as a processor 202, or the like, configured to initiate a message application. In an example embodiment in which the RTB prompt is not received in a message application, such as in a website or mobile application, the processor 202 may open or initiate a message application to facilitate the RTB reply message. For example, the RTB prompt may include an email link in a website, the processor 202 may open an email application in response to receiving the RTB prompt selection indication.

As shown in Block 708 of FIG. 7, the apparatus 200 may include means, such as a processor 202, or the like, configured to populate a RTB reply message based on the RTB prompt. The processor 202 may populate the subject or message field of the RTB reply message with the RTB identifier for the selected RTB prompt. The RTB reply message may additionally be populated with information such as product identification, product identification code, consumer processing information, consumer processing identification code, or other electronic transaction information which the consumer may use to verify the promotion details and consumer processing information. The product identification or product identification code may include the product information, such as Super brand running shoes, product details, such as size, color, quantity, model numbers, or the like. The consumer processing information or consumer processing information code may include information such as the consumer identifier, shipping address or identifier, payment method or identifier, or the like.

As shown in Block 710 of FIG. 7, the apparatus 200 may include means, such as the processor 202, the user interface 208, or the like, configured to enter a RTB validation code into the RTB reply message. A consumer may enter the RTB validation code into the message, body, header, subject, or the like using the user interface 208. The processor 202 may populate the RTB validation code into the reply message as received from the user interface 208.

As shown in Block 712 of FIG. 7, the apparatus 200 may include means, such as the processor 202, the user interface 208, or the like, configured to enter a promotional code into the RTB reply message the consumer may enter a promotional code, e.g. discount code into the reply message. The promotional code may be entered into the message body, subject line, or the like. The host device 12 or recipient device 14 may validate and apply a discount or other parameter to the purchased good or service based on the promotional code.

As shown in Block 714 of FIG. 7, the apparatus 200 may include means, such as the processor 202, the user interface 208, or the like, configured to enter gift information or additional persons information into the RTB reply message. A consumer may enter an indication that the product or service is a gift and associated gift recipient information, such as name address, note, or the like. The consumer may indicate the product or service is a gift by entering "gift" in the RTB reply message body, subject line, or the like followed by the gift recipient information.

In an example embodiment, the consumer may indicate other persons associated with a purchase by entering additional message addresses or identifiers in a carbon copy line, entering "others" in the RTB reply message body or subject line, or the like. For example, if the consumer selects a RTB prompt for a dinner for four and enter the names of the other attendees in the carbon copy field, or otherwise indicate the other attendees. The provider and/or the promotion and marketing host 12 may send the confirmation message discussed in FIG. 7, to the consumer and the three other attendees.

As shown in Block 716 of FIG. 7, the apparatus 200 may include means, such as the processor 202, a communications interface 206, or the like, configured to cause a transmission of the RTB reply message to the host device, such as host device 12. The processor 202 may cause the communications interface 206 to transmit the RTB reply message to the host device 12 using wire to wireless communications.

As shown in Block 712 of FIG. 7, the apparatus 200 may include means, such as the processor 202, a communications interface 206, or the like, configured to receive a RTB confirmation message. The processor 202 may receive the RTB confirmation message from the communications interface 206, which in turn receives the RTB confirmation message from a host device 12. The host device 12 may receive the confirmation message from a recipient device 14 as discussed in FIG. 6.

Example Process for Authentication of a RTB Validation Code

Figure 8:
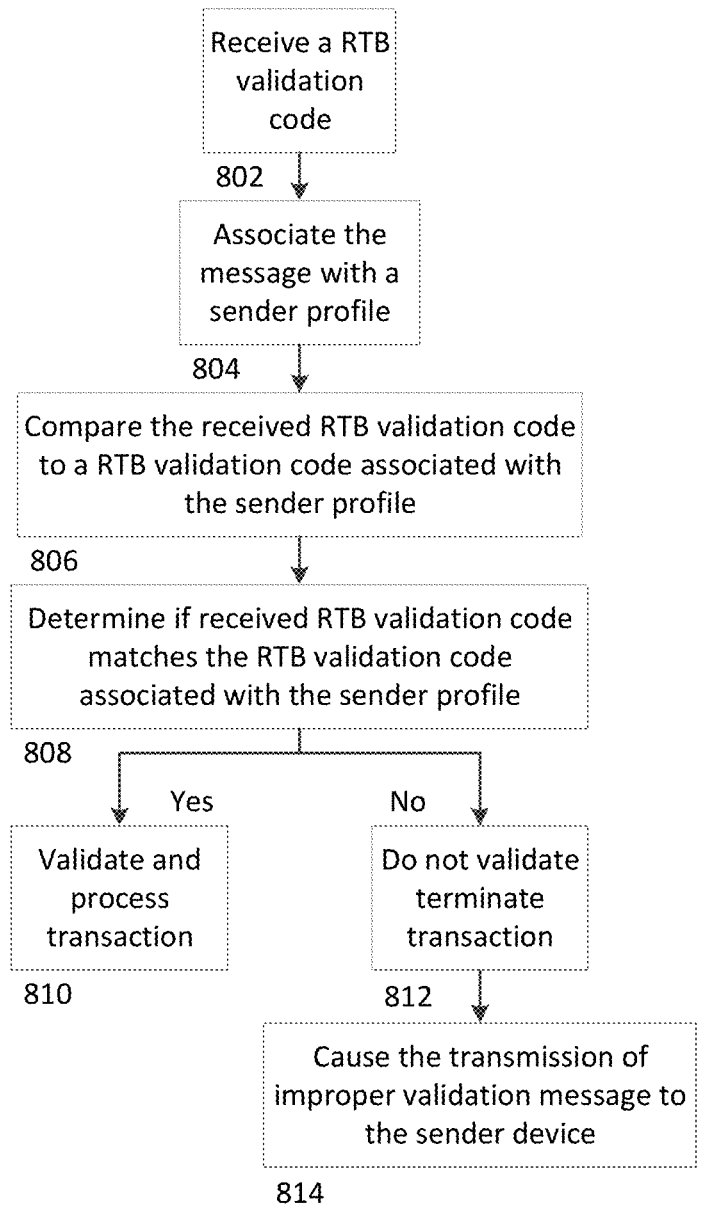

Referring now to FIG. 8, the operations performed such as by an apparatus 200 in FIG. 2, for authentication of a RTB validation code are illustrated. As shown in Block 802 in FIG. 8, the apparatus 200 may include means, such as the processor 202, or the like, for receiving a RTB validation code. The processor 202 may receive the validation code as a portion of a RTB reply message received from a sender device, such as sender device 10.

As shown in Block 804 of FIG. 8, the apparatus 200 may include means, such as the processor 202, a memory 204, or the like, configured to associate the RTB reply message with a consumer profile. The processor 202 may associate the RTB reply message with the consumer profile based on a sender message identifier, consumer data, such as consumer identifier in the RTB reply message, or the like. The processor 202 may retrieve the consumer profile from the memory 204, such as a subscription management database or consumer profile database.

As shown in Block 806 of FIG. 8, the apparatus 200 may include means, such as the processor 202, or the like, configured to compare the received RTB validation code to a RTB validation code associated with the consumer profile. The processor 202 may retrieve the RTB validation code associated with the consumer profile from the consumer profile and compare the syntax of the received RTB validation code to the syntax of the RTB validation code associated with the consumer profile.

As shown in Block 808 of FIG. 8, the apparatus 200 may include means, such as the processor 202, or the like, configured to determine if the RTB validation code matches the RTB validation code associated with a consumer profile. In an instance in which the RTB validation code matches the RTB validation code associated with a consumer profile, the process continues at Block 810. In an instance in which the received RTB validation code does not match the RTB validation code associated with a consumer profile, the process continues at Block 812.

As shown in Block 810 of FIG. 8, the apparatus 200 may include means, such as the processor 202 or the like, configured to validate and process the transaction. In an instance in which the RTB validation code matches the RTB validation code associated with a consumer profile and continues processing the transaction as discussed in FIG. 6.

At Block 812 of FIG. 8, the apparatus 200 may include means, such as the processor 202, to not validate the RTB validation code and terminate the transaction. In an instance in which the received RTB validation code does not matches the RTB validation code associated with a consumer profile, the processor 202 will terminate the transaction.

As shown in Block 814 of FIG. 8, the apparatus 200 may include means, such as the processor 202, communications interface 206, or the like, configured to cause transmission of an improper validation message to the sender device. The processor 202 may populate a message indicating that the validation of the RTB validation code was improper. The processor 202 may cause the communications interface 206 to transmit the improper validation message to the sender device 10 using a sender message identifier.

Example Electronic Marketing Communications Including RTB Prompt

FIG. 9 illustrates an example electronic marketing communication with a RTB prompt. The electronic marketing communication 900 may include a product image 902, promotion details 904, a buy prompt or link 906, and a RTB prompt or link 908. The product image 902 may include an image of the product or an image associated with the product, and/or a promotion price. For example, a pair of running shoes for a promotion price of $25.00. Additionally, the electronic marketing communication may include a value, a discount value, and a savings, such as the value of the running shoes being $50 with a discount of 50% and a savings of $25. Promotion information may include the provider information, such as Shoe Store; product information, such as Super Brand Running Shoes, size, color, quantity, model number, or the like. For example, Shoe Store Super Brand Running Shoes, size 10, color blue A buy link or prompt 906, may direct the sender device 10 to a traditional checkout webpage or application in which the product or service may be selected. Payment information, consumer information, shipping information or like, may also be selected or entered and the transaction completed.

The RTB prompt 908 may be selected opening a secondary message application, such as an email application, social media messaging application, SMS messaging application or the like. A RTB reply message may be populated and a RTB transaction may be completed as discussed in FIGS. 6 and 7. In some example embodiments, promotion product details, such as size, quantity, color or the like, may have separate RTB prompts for each product detail or combination of details. Additionally, RTB prompts may be provided for shipping addresses, payment methods, or the like.

FIGS. 10a and 10b illustrate example electronic marketing communications in a message application, such as email, which may be a RTB message or targeted RTB prompt. The RTB message 1000 may include a message header 1002, a message body 1004, and a promotion display 1006. The promotion display 1006 may include a promotion image 1008, promotion details 1010, and a RTB prompt 1012. The email header may include to, from, and subject fields. For example, to the consumer (e.g. JonCaston@internet.com); from a promotion and marketing service host, (e.g. GrouponRTB@groupon.com); and a subject (e.g. Reply to Buy Message ((Running Shoes)). The body 1004 may include the impression 1006.

In FIG. 10a, the RTB prompt may be a RTB link. The RTB link 1012 may cause a secondary application, such as a messaging application, email application or social media application to open and populate an RTB reply message. The consumer may then enter the RTB validation code and submit the message, which may be sent to a host device 12, as discussed in FIGS. 6 and 7.

In an additional alternative embodiment, FIG. 10b, the RTB message address includes the RTB identifier, (e.g. GPONSSSBRS10B@groupon.com). In this example, a predetermined RTB validation code (e.g., Yes, please) is provided in the message body. The user may reply to the message by entering "Yes, please" in a reply message initiating the reply message transaction, as discussed in FIGS. 6 and 7. Additionally, as an alternative to the RTB transaction process, a traditional check out link is provided, e.g. "click here" link.

Example RTB Reply Message

FIG. 11 illustrates an example embodiment of a RTB reply message in accordance with an example embodiment of the present invention. The RTB reply message 1100 may include a message header 1102 and a message body 1104. The message body 1104 may include a RTB validation code 1106, a promotion code 1108, a promotional product identification and/or promotion product identification code 1110, and a consumer processing identification or consumer processing identification code 1112. The message header may include a to-field, such as to promotional and marketing service host (e.g., GrouponRTB@groupon.com); a from field, including a consumer message address (e.g., JonCaston@internet.com); and a subject field, including a reply message subject (e.g., Re: Reply to Buy Message (Running Shoes)).

The validation code 1106 may be a predetermined or self-selected validation code as discussed in FIG. 5. The promotion code 1108 may be a code associated with a discount for specific product and/or product and time, for example, the Charlotte Iron Man 15% off, represented by CLTIM15.

The promotional product identification may include a product narrative such as Super Brand Running Shoes, Size 10, Blue and/or a RTB identifier, such as (GPONSSSBRS10B) corresponding to Groupon, Shoe Store, Super Brand, Running Shoe, Size 10, Blue. The consumer processing identification or consumer processing identification code 1112 may include a consumer name, e.g. John Caston, a primary address, a primary payment method, a gift address, a gift recipient or the like.

In an instance in which the RTB message address includes the RTB identifier, the To field may include the RTB message address including the RTB identifier, (e.g. GPONSSSBRS10B@groupon.com).

Computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

In some embodiments, certain ones of the operations above may be modified or further amplified. Furthermore, in some embodiments, additional optional operations may be included, such as illustrated by the dashed outline of blocks 602, 604, 606, 614, 620, 622, and 624 of FIG. 6; and 702, 704, 706 and 718 of FIG. 7. Modifications, additions, or amplifications to the operations above may be performed in any order and in any combination.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory including computer program code, the at least one memory and computer program code configured to, with the processor, cause the apparatus to at least:

generate a plurality of reply to buy (RTB) prompts, each configured for transmission in a single electronic communication via a first electronic communication channel, each RTB prompt being associated with at least one particular option of a specific promotion and comprising a promotion identifier configured to be unique to the specific promotion and the at least one particular option of the specific promotion, and identify the specific promotion and the at least one particular option of the specific promotion, and a selectable link, the selectable link comprising information identifying a second electronic communication channel and, upon selection, configured to initiate a particular message application on a sender device associated with transmission of messages via the second electronic communication channel, and programmatically populate a RTB reply message with the promotion identifier configured to be unique to the specific promotion and an indication of a selection of one of the at least one particular option of the specific promotion, and receive, via a user interface, input of a preselected RTB validation code associated with a particular consumer profile;

transmit the single electronic communication via the first electronic communication channel;

receive, via the second electronic communication channel, the RTB reply message, from the sender device, comprising three different elements, the three different elements being (1) the promotion identifier configured to be unique to the specific promotion, (2) the indication of the selection of the one of the at the least one particular option of the specific promotion, and (3) the pre-selected RTB validation code associated with the particular consumer profile;

parse, by the processor, the RTB reply message to identify various data for processing, including (1) the promotion identifier configured to be unique to the specific promotion, (2) the indication of the selection of the one of the at the least one particular option of the specific promotion, and (3) the pre-selected RTB validation code associated with the particular consumer profile;

authenticate the pre-selected RTB validation code, upon parsing the RTB reply message and identifying the pre-selected RTB validation code, via a comparison to stored data in the particular consumer profile;

upon authentication of the pre-selected RTB validation code, retrieve promotion details based on the promotion identifier, and associate the RTB reply message with a recipient identifier indicative of a recipient device;

obfuscate a sender address associated with at least the RTB reply message to generate a transaction address based at least in part on the sender address associated with at least the RTB reply message;

generate a purchase order message comprising the transaction address as the sender address associated with the purchase order message; and transmit the purchase order message to the recipient device.

2. The apparatus of claim 1, wherein the at least one memory and the computer program code are further configured to:

receive discretionary data, electronic marketing data, and communications channel data from the sender device;

receive promotion parameters associated with a plurality of promotions;

determine a first relevance criteria based on at least one of the discretionary data, electronic marketing data, and communications channel data;

generate a first ranking of the plurality of promotions based on correlating the first relevance criteria to the promotion parameters of the plurality of promotions;

determine a second relevance criteria based on at least one of the discretionary data, electronic marketing data, and the communications channel data;

generate a second ranking of the plurality of promotions based on correlating the second relevance criteria to the promotion parameters of the plurality of promotions;

compare the first and second ranking of the plurality promotions to a relevance threshold;

determining relevant promotions based on the first or second ranking or promotions satisfying the relevance threshold; and wherein the RTB identifier is associated a relevant promotion.

3. The apparatus of claim 1, wherein the at least one memory and the computer program code are further configured to:

receive an RTB confirmation message from the recipient device in response to transmission of the RTB purchase order message; and transmit the confirmation message to the sender device.

4. The apparatus of claim 1, wherein the at least one memory and the computer program code are further configured to:

assign a first transaction address to the sender device and a second transaction address to a recipient device;

associate the message from the sender device with the first transaction address; and wherein to transmit the purchase order message to the recipient device uses the first transaction address.

5. The apparatus of claim 4, wherein the at least one memory and the computer program code are further configured to:

associate the RTB confirmation message with the second transactional address; and wherein to transmit the RTB confirmation message to the sender device uses the second transaction address.

6. The apparatus of claim 1, wherein the at least one memory and the computer program code are further configured to:

determine relevant promotions; and wherein the RTB identifier is associated with at least one relevant promotion.

7. The apparatus of claim 1, wherein the message from the sender device is an RTB reply message indicative of selection promotion associated with the RTB prompt.

8. The apparatus of claim 1, wherein transmission of the RTB prompt comprises transmitting an RTB message.

9. The apparatus of claim 8, wherein the RTB message comprises a RTB message address based on the RTB identifier.

10. The apparatus of claim 1, wherein the RTB identifier is further based on a consumer identifier.

11. The apparatus of claim 1, the apparatus further caused to:

configure the selectable link to, in response to user engagement, populate at least a promotion description corresponding to the specific promotion in a body of the RTB reply message.

12. The apparatus of claim 1, wherein the preselected RTB validation code is defined by a brand identifier, a product identifier, or a service identifier associated with the specific promotion.

13. The apparatus of claim 1, the apparatus further caused to:

parse a trigger word from the RTB reply message that indicates the RTB message is associated with a gift transaction; and identify a gift recipient identifier from the RTB reply message in response to parsing the trigger word.

14. The apparatus of claim 1, wherein to generate the transaction address the apparatus is caused to:

calculating a combined value that mathematically combines at least the sender address associated with at least the RTB reply message with one or more selected from a group of a RTB reply message identifier, the recipient identifier, or other data of the RTB reply message; and hash the combined value to generate the transaction address.

15. The apparatus of claim 1, wherein the transaction address is utilized to process a plurality of transactions during a transaction period.

16. A computer program product comprising at least one non-transitory computer-readable storage medium having computer-executable program code portions stored therein, the computer-executable program code portions comprising program code instructions configured to:

generate a plurality of reply to buy (RTB) prompts, each configured for transmission in a single electronic communication via a first electronic communication channel, each RTB prompt being associated with at least one particular option of a specific promotion and comprising a promotion identifier configured to be unique to the specific promotion and the at least one particular option of the specific promotion, and identify the specific promotion and the at least one particular option of the specific promotion, and a selectable link, the selectable link comprising information identifying a second electronic communication channel and, upon selection, configured to initiate a particular message application on a sender device associated with transmission of messages via the second electronic communication channel, and programmatically populate a RTB reply message with the promotion identifier configured to be unique to the specific promotion and an indication of a selection of one of the at least one particular option of the specific promotion, and receive, via a user interface, input of a preselected RTB validation code associated with a particular consumer profile;

transmit the single electronic communication via the first electronic communication channel;

receive, via the second electronic communication channel, the RTB reply message, from the sender device, comprising three different elements, the three different elements being (1) the promotion identifier configured to be unique to the specific promotion, (2) the indication of the selection of the one of the at the least one particular option of the specific promotion, and (3) the pre-selected RTB validation code associated with the particular consumer profile;

parse, by the processor, the RTB reply message to identify various data for processing, including (1) the promotion identifier configured to be unique to the specific promotion, (2) the indication of the selection of the one of the at the least one particular option of the specific promotion, and (3) the pre-selected RTB validation code associated with the particular consumer profile;

authenticate the pre-selected RTB validation code, upon parsing the RTB reply message and identifying the pre-selected RTB validation code, via a comparison to stored data in the particular consumer profile;

upon authentication of the pre-selected RTB validation code, retrieve promotion details based on the promotion identifier, and associate the RTB reply message with a recipient identifier indicative of a recipient device;

obfuscate a sender address associated with at least the RTB reply message to generate a transaction address based at least in part on the sender address associated with at least the RTB reply message;

generate a purchase order message comprising the transaction address as the sender address associated with the purchase order message; and transmit the purchase order message to the recipient device.

17. The computer program product of claim 16, wherein the computer-executable program code portions further comprise program code instructions configured to:

receive discretionary data, electronic marketing data, and communications channel data from the sender device;

receive promotion parameters associated with a plurality of promotions;

determine a first relevance criteria based on at least one of the discretionary data, electronic marketing data, and communications channel data;

generate a first ranking of the plurality of promotions based on correlating the first relevance criteria to the promotion parameters of the plurality of promotions;

determine a second relevance criteria based on at least one of the discretionary data, electronic marketing data, and the communications channel data;

generate a second ranking of the plurality of promotions based on correlating the second relevance criteria to the promotion parameters of the plurality of promotions;

compare the first and second ranking of the plurality promotions to a relevance threshold;

determining relevant promotions based on the first or second ranking or promotions satisfying the relevance threshold; and wherein the RTB identifier is associated a relevant promotion.

18. The computer program product of claim 16, wherein the computer-executable program code portions further comprise program code instructions configured to:

receive an RTB confirmation message from the recipient device in response to transmission of the RTB purchase order message; and transmit the RTB confirmation message to the sender device.

19. The computer program product of claim 18, wherein the computer-executable program code portions further comprise program code instructions configured to:

assign a first transaction address to the sender device and a second transaction address to a recipient device;

associate the message from the sender device with the first transaction address; and wherein to transmit the purchase order message to the recipient device uses the first transaction address.

20. The computer program product of claim 19, wherein the computer-executable program code portions further comprise program code instructions configured to:

associate the RTB confirmation message with the second transactional address; and wherein to transmit the RTB confirmation message to the sender device uses the second transaction address.

* * * * *